United States Patent
Morishima et al.

(10) Patent No.: US 11,241,844 B2
(45) Date of Patent: Feb. 8, 2022

(54) METHOD FOR INSERTING OUT-OF-PLANE REINFORCEMENT THREADS AND METHOD FOR PRODUCING FIBER-CONTAINING MATERIAL

(71) Applicant: MITSUBISHI HEAVY INDUSTRIES, LTD., Tokyo (JP)

(72) Inventors: Shunichi Morishima, Tokyo (JP); Toshio Kozasa, Tokyo (JP); Masatake Hatano, Tokyo (JP); Kazuaki Kishimoto, Tokyo (JP); Yukio Takeuchi, Tokyo (JP); Masayuki Yamashita, Tokyo (JP); Hitoshi Ojika, Aichi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 353 days.

(21) Appl. No.: 16/312,303

(22) PCT Filed: Jun. 2, 2017

(86) PCT No.: PCT/JP2017/020626
§ 371 (c)(1),
(2) Date: Dec. 21, 2018

(87) PCT Pub. No.: WO2018/025488
PCT Pub. Date: Feb. 8, 2018

(65) Prior Publication Data
US 2019/0240927 A1 Aug. 8, 2019

(30) Foreign Application Priority Data
Aug. 1, 2016 (JP) .............................. JP2016-151562

(51) Int. Cl.
*B29C 70/24* (2006.01)
*D04H 1/45* (2006.01)
(Continued)

(52) U.S. Cl.
CPC ................ *B29C 70/24* (2013.01); *B32B 5/28* (2013.01); *B32B 38/04* (2013.01); *C08J 5/24* (2013.01);
(Continued)

(58) Field of Classification Search
None
See application file for complete search history.

(56) References Cited

U.S. PATENT DOCUMENTS

| 4,786,541 A | 11/1988 | Nishimura et al. |
| 4,808,461 A | 2/1989 | Boyce et al. |

(Continued)

FOREIGN PATENT DOCUMENTS

| JP | S59165647 A | 9/1984 |
| JP | 2001511827 A | 8/2001 |

(Continued)

OTHER PUBLICATIONS

Translation of JP 2011-09847. Obtained from EPO global Dossier website.*

(Continued)

*Primary Examiner* — Christopher T Schatz
(74) *Attorney, Agent, or Firm* — Hauptman Ham, LLP

(57) ABSTRACT

Provided are: a fiber-containing material which has improved strength in an out-of-plane direction without a decrease in strength in an in-plane direction; a method for inserting out-of-plane reinforcement threads; and a method for producing the fiber-containing material. The fiber-containing material contains a base material and out-of-plane reinforcement threads. The base material contains reinforcement fibers extending in a direction along a plane. The out-of-plane reinforcement threads are formed in the base material so as to extend in a direction intersecting the direction along the plane.

5 Claims, 10 Drawing Sheets

(51) Int. Cl.
*D04H 3/04* (2012.01)
*B32B 5/28* (2006.01)
*C08J 5/24* (2006.01)
*B32B 38/04* (2006.01)
*B29K 63/00* (2006.01)
*B32B 5/26* (2006.01)

(52) U.S. Cl.
CPC .............. *D04H 1/45* (2013.01); *D04H 3/04* (2013.01); *B29K 2063/00* (2013.01); *B32B 5/26* (2013.01); *B32B 2262/101* (2013.01); *B32B 2262/106* (2013.01); *B32B 2371/00* (2013.01)

(56) References Cited

U.S. PATENT DOCUMENTS

| | | | |
|---|---|---|---|
| 6,139,942 | A | 10/2000 | Hartness et al. |
| 2002/0153084 | A1 | 10/2002 | Johnson et al. |
| 2010/0021682 | A1 | 1/2010 | Liang et al. |
| 2010/0209658 | A1 | 8/2010 | Roth |
| 2010/0215887 | A1 | 8/2010 | Kawabe |
| 2016/0069009 | A1 | 3/2016 | Meer |

FOREIGN PATENT DOCUMENTS

| | | |
|---|---|---|
| JP | 2004536725 A | 12/2004 |
| JP | 2011502558 A | 1/2011 |
| JP | 2011098467 A | 5/2011 |
| JP | 2012254632 A | 12/2012 |
| WO | 9953801 A1 | 10/1999 |

OTHER PUBLICATIONS

Extended European Search Report for European Application No. 17836595.3 dated Jun. 6, 2019; 7pp.

International Search Report and Written Opinion for International Application No. PCT/JP/2017/020626 dated Aug. 22, 2017; 14pp.

* cited by examiner

METHOD FOR INSERTING OUT-OF-PLANE REINFORCEMENT THREADS AND METHOD FOR PRODUCING FIBER-CONTAINING MATERIAL

RELATED APPLICATIONS

The present application is a National Phase of International Application Number PCT/JP2017/020626 filed Jun. 2, 2017 and claims priority to Japanese Application Number 2016-151562 filed Aug. 1, 2016.

TECHNICAL FIELD

The present invention relates to a method for inserting out-of-plane reinforcement threads and a method for producing a fiber-containing material.

BACKGROUND ART

As a material having a lightweight property and a high strength, a composite material obtained by impregnating reinforcement fibers with a resin is known. The composite material is used for aircrafts, cars, ships, and the like. The composite material is used in a form of overlaid sheets. In some cases, a sheet-like composite material becomes weak in an out-of-plane direction orthogonal to an in-plane direction in which the sheet shape extends. As a method for reinforcing the sheet-like composite material in the out-of-plane direction, a method of sewing a sheet-like composite material with a thread is known (refer to Patent Literature 1).

CITATION LIST

Patent Literature

[PTL 1] Specification of U.S. Pat. No. 4,786,541

SUMMARY OF INVENTION

Technical Problem

FIG. 16 is a schematic constituent view of a sheet-like composite material 100 of the related art. FIG. 17 is a schematic cross-sectional view of the sheet-like composite material 100 of the related art. FIG. 18 is an enlarged cross-sectional view of a region A in FIG. 16. As illustrated in FIG. 16, FIG. 17, and FIG. 18, the sheet-like composite material 100 is obtained by impregnating reinforcement fibers 100$f$ with a resin. As the composite material 100, in FIG. 16, FIG. 17, and FIG. 18, a laminate of four layers of a composite material is exemplified. As illustrated in FIG. 17, the composite material 100 has four central axes 100$a$, 100$b$, 100$c$, and 100$d$ of fiber layers. The four central axes 100$a$, 100$b$, 100$c$, and 100$d$ of the fiber layers extend along an in-plane direction. In the composite material 100, the strength is increased by the reinforcement fibers 100$f$ in the in-plane direction, but the strength is not increased in an out-of-plane direction. Therefore, the composite material 100 has a problem of a likelihood of an interlayer breakage portion 100$x$ being formed between layers as illustrated in FIG. 16 and FIG. 18. In order to deal with this problem, the method described in Patent Literature 1 is known.

FIG. 19 is a schematic constituent view of an improved sheet-like composite material 200 of the related art. FIG. 20 is an enlarged cross-sectional view of a region B in FIG. 19. The improved sheet-like composite material 200 of the related art is obtained by improving the sheet-like composite material 100 using the method of Patent Literature 1. The composite material 200 is obtained by sewing a composite material obtained by impregnating reinforcement fibers 200$f$ with a resin with reinforcement threads 202 as illustrated in FIG. 19 and FIG. 20. As the composite material 200, in FIG. 19 and FIG. 20, a laminate of four layers of a composite material is exemplified. As illustrated in FIG. 20, the composite material 200 has four central axes 200$a$, 200$b$, 200$c$, and 200$d$ of fiber layers. The four central axes 200$a$, 200$b$, 200$c$, and 200$d$ of the fiber layers extend along an in-plane direction. The composite material 200 is reinforced by the reinforcement threads 202 in an out-of-plane direction. However, the four central axes 200$a$, 200$b$, 200$c$, and 200$d$ of the fiber layers are caused to meander due to the reinforcement threads 202. Therefore, the composite material 200 has a problem of a likelihood of the strength in the in-plane direction being decreased due to the reinforcement threads 202 compared with the composite material 100.

The present invention has been made in consideration of what has been described above and an object of the present invention is to provide a fiber-containing material which has improved strength in an out-of-plane direction without a decrease in strength in an in-plane direction, a method for inserting out-of-plane reinforcement threads, and a method for producing the fiber-containing material.

Solution to Problem

In order to solve the above-described problems and achieve the object, a method for inserting out-of-plane reinforcement threads includes a preparation step of preparing a base material including reinforcement fibers that extend in a direction along a plane and an out-of-plane reinforcement thread insertion step of inserting the out-of-plane reinforcement threads into an inside of the prepared base material only in a direction intersecting the direction along the plane.

According to this constitution, since the out-of-plane reinforcement threads are inserted without forming the in-plane reinforcement threads, it is possible to cause the reinforcement fibers increasing the strength in an in-plane direction and the out-of-plane reinforcement threads increasing the strength in an out-of-plane direction to coexist in a fiber-containing material, and thus it is possible to improve the strength in the out-of-plane direction without a decrease in the strength of the fiber-containing material in the in-plane direction.

In this constitution, a hole-forming step of forming a hole for inserting the out-of-plane reinforcement threads in the direction intersecting the direction along the plane in the base material is preferably further included after the preparation step and before the out-of-plane reinforcement thread insertion step. According to this constitution, the out-of-plane reinforcement threads are inserted into the hole formed in the hole-forming step in the out-of-plane reinforcement thread insertion step, and thus it is possible to smoothly insert the out-of-plane reinforcement threads.

In the constitution including the hole-forming step, it is preferable that the hole-forming step is carried out using a hole-forming portion that radiates a laser to the base material in the direction intersecting the direction along the plane and the out-of-plane reinforcement thread insertion step is carried out using a fiber fragment injection portion that injects fiber fragments which serve as the out-of-plane reinforcement threads into the base material in the direction intersecting the direction along the plane. According to this constitution, it is possible to carry out the hole-forming step without bringing the hole-forming portion into contact with the base material and carry out the out-of-plane reinforcement thread insertion step without bringing the fiber fragment injection portion into contact with the base material, and thus it is possible to rapidly and accurately carry out the hole-forming step and the out-of-plane reinforcement thread insertion step. In addition, it is possible to control the length of the out-of-plane reinforcement thread by controlling the length of the fiber fragment being injected by the fiber fragment injection portion.

Alternately, in the constitution including the hole-forming step, it is preferable that the hole-forming step is carried out using an insertion needle being inserted into the base material, the out-of-plane reinforcement thread insertion step is carried out using the insertion needle having a hole through which an insertion fiber to be inserted into the base material has been passed, and the method further includes a cutting step of cutting the insertion fiber inserted into the base material on both surface sides of the base material to use the cut insertion fiber as the out-of-plane reinforcement threads after the out-of-plane reinforcement thread insertion step. According to this constitution, the hole-forming step and the out-of-plane reinforcement thread insertion step are continuously carried out using the insertion needle, and thus it is possible to rapidly and accurately carry out the hole-forming step and the out-of-plane reinforcement thread insertion step. In addition, it is possible to control the length of the out-of-plane reinforcement thread by controlling the cutting location of the out-of-plane reinforcement thread in the cutting step.

In these constitutions, it is preferable that, in the preparation step, a protective sheet is provided on at least one surface of the base material and, in the out-of-plane reinforcement thread insertion step, the out-of-plane reinforcement threads are inserted into the inside of the base material and an inside of the protective sheet in the direction intersecting the direction along the plane. According to this constitution, it is possible to easily insert the out-of-plane reinforcement threads that protrude from the base material toward at least one of a thickness direction longer than a thickness of the base material in the direction intersecting the direction along the plane, and thus, in the case of adhering a separate member to the side from which the out-of-plane reinforcement threads protrude, it is possible to improve the adhesion strength due to the protruding out-of-plane reinforcement threads.

In the constitution in which the protective sheet is provided on at least one surface of the base material in the preparation step, a sheet removal step of removing the protective sheet is preferably further included after the out-of-plane reinforcement thread insertion step. According to this constitution, due to the sheet removal step, it is possible to adhere a separate member to the surface which is protected by the protective sheet until the use of the fiber-containing material and from which the out-of-plane reinforcement threads of the fiber-containing material protrude.

In addition, in order to solve the above-described problems and achieve the object, a method for producing a fiber-containing material is capable of producing a fiber-containing material in which the out-of-plane reinforcement threads are formed in the inside of the base material including the reinforcement fibers using any one of the methods for inserting out-of-plane reinforcement threads described above.

According to this constitution, it is possible to produce a fiber-containing material in which reinforcement fibers increasing the strength in the in-plane direction and the out-of-plane reinforcement threads increasing the strength in the out-of-plane direction are caused to coexist, and thus it is possible to produce a fiber-containing material which has improved the strength in the out-of-plane direction without a decrease in the strength in the in-plane direction.

In this constitution, an impregnation step of impregnating the reinforcement fibers with a resin is preferably further included. According to this constitution, it is possible to produce a fiber-containing material having a lighter-weight property and a higher strength.

In the constitution including the impregnation step, a curing step of curing the resin is preferably further included after the out-of-plane reinforcement thread insertion step and after the impregnation step. According to this constitution, it is possible to produce a fiber-containing material having a structure stabilized in accordance with the light-weight property and the high strength.

Advantageous Effects of Invention

According to the present invention, it is possible to provide a fiber-containing material which has improved strength in an out-of-plane direction without a decrease in strength in an in-plane direction, a method for inserting out-of-plane reinforcement threads, and a method for producing the fiber-containing material.

DESCRIPTION OF EMBODIMENTS

Hereinafter, embodiments according to the present invention will be described in detail on the basis of drawings. Meanwhile, this invention is not limited by these embodiments. In addition, constituent elements that can be or are easily substituted by a person skilled in the art or are substantially equal are included in the scope of constituent elements in the embodiments. Furthermore, constituent elements described below can be appropriately combined together.

First Embodiment

Figure 1:
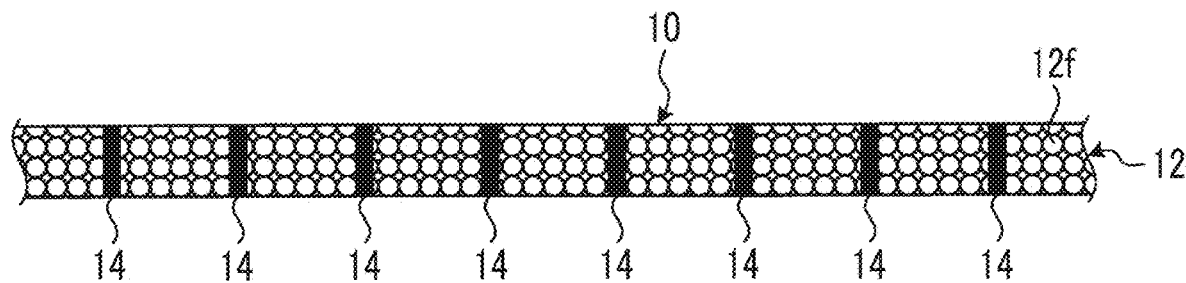
FIG. 1 is a schematic cross-sectional view illustrating an example of a fiber-containing material according to a first embodiment of the present invention.

FIG. 1 is a schematic cross-sectional view illustrating a fiber-containing material 10 that is an example of a fiber-containing material according to a first embodiment of the present invention. While FIG. 1 illustrates a schematic cross-sectional view, a shape of the fiber-containing material 10 in a plan view seen in an out-of-plane direction may be any shape. As illustrated in FIG. 1, the fiber-containing material 10 includes a base material 12 and out-of-plane reinforcement threads 14. The base material 12 is a material that extends in an in-plane direction which is a direction along a plane and includes reinforcement fibers 12f that extend in the in-plane direction. The base material 12 is not limited thereto and may have a curved portion or a level difference portion in the out-of-plane direction which is a direction intersecting the direction along the plane of the base material 12. The out-of-plane reinforcement threads 14 are formed to extend along the out-of-plane direction which is a direction intersecting the direction along the plane of the base material 12 in the base material 12. The out-of-plane reinforcement thread 14 has the same length as a thickness of the base material 12 in the direction intersecting the direction along the plane. In the fiber-containing material 10, the out-of-plane reinforcement threads 14 are uniformly distributed in the direction along the plane of the base material 12 in FIG. 1, but the present invention is not limited thereto, and the out-of-plane reinforcement threads 14 may be unevenly distributed. In a case in which the fiber-containing material 10 has a curved portion or a level difference portion in the base material 12, the out-of-plane reinforcement threads 14 are preferably distributed at a high density in the curved portion or the level difference portion that is a place to which a stress of the base material 12 applies. The out-of-plane reinforcement threads 14 are preferably orthogonal to the direction along the plane of the base material 12. The fiber-containing material 10 preferably has only the out-of-plane reinforcement threads 14 that intersect the direction along the plane of the base material 12 and does not have any reinforcement threads in the direction along the plane of the base material 12, that is, a direction parallel to the plane of the base material 12.

As the reinforcement fiber 12f, a reinforcement fiber obtained by bundling approximately several hundreds to several thousands of basic fibers in a range of 5 μm or more and 7 μm or less is exemplified. As the basic fiber that constitutes the reinforcement fiber 12f, a carbon fiber is exemplified at all times. The basic fiber that constitutes the reinforcement fiber 12f is not limited thereto and may also be a plastic fiber, a glass fiber, or a metal fiber.

As the base material 12, a preform including the reinforcement fibers 12f and a composite material obtained by impregnating the reinforcement fibers 12f with a resin are exemplified. The resin with which the reinforcement fibers 12f are impregnated is preferably a thermosetting resin, but may also be a thermoplastic resin. As the thermosetting resin, an epoxy resin is exemplified. As the thermoplastic resin, polyether ether ketone (PEEK), polyether ketone ketone (PEKK), polyphenylene sulfide (PPS), and the like are exemplified. However, the resin with which the reinforcement fibers 12f are impregnated is not limited thereto and may also be a different resin.

In a case in which the resin with which the reinforcement fibers 12f are impregnated is a thermosetting resin, the thermosetting resin may be in a softened state, a cured state, or a semi-cured state. The softened state refers to a state in which the thermosetting resin is to be thermally cured. The softened state is a state in which the thermosetting resin is not capable of supporting itself and a state in which the shape cannot be maintained in a case in which the thermosetting resin is not supported by a support. The softened state is a state in which a thermal curing reaction of the thermosetting resin can be caused by heating the thermosetting resin. The cured state refers to a state in which the thermosetting resin is capable of supporting itself and a state in which the shape can be maintained even in a case in which the thermosetting resin is not supported by a support. The cured state is a state in which a thermal curing reaction of the thermosetting resin cannot be caused even when the thermosetting resin is heated. The semi-cured state refers to a state in which the thermosetting resin is thermally cured to an extent that is weaker than that of the cured state. The semi-cured state is a state in which the thermosetting resin is capable of supporting itself and a state in which the shape can be maintained even in a case in which the thermosetting resin is not supported by a support. The semi-cured state is a state in which a thermal curing reaction of the thermosetting resin can be caused by heating the thermosetting resin. The composite material having the reinforced fiber 12f impregnated with a thermosetting resin is preferably a prepreg in which the thermosetting resin is in the semi-cured state or a material in which the thermosetting resin is in the cured state.

As the out-of-plane reinforcement thread 14, a reinforcement thread obtained by bundling approximately several hundreds to several thousands of basic fibers in a range of 5

µm or more and 7 µm or less is exemplified. As the basic fiber that constitutes the out-of-plane reinforcement thread 14, a nylon fiber is exemplified at all times. The basic fiber that constitutes the out-of-plane reinforcement thread 14 is not limited thereto and may also be a plastic fiber, a carbon fiber, a glass fiber, or a metal fiber.

In the fiber-containing material 10, the reinforcement fibers 12f increasing the strength in the in-plane direction and the out-of-plane reinforcement threads 14 increasing the strength in the out-of-plane direction are capable of coexisting without causing central axes of fiber layers to meander, and thus it is possible to improve the strength in the out-of-plane direction without a decrease in the strength in the in-plane direction.

In the fiber-containing material 10, the out-of-plane reinforcement thread 14 has the same length as the thickness of the base material 12 in the direction intersecting the direction along the plane, and thus the strength in the out-of-plane direction improves without changing the shape of the fiber-containing material 10.

In a case in which the base material 12 is a composite material having the reinforcement fibers 12f impregnated with a resin, the fiber-containing material 10 is capable of having a lighter-weight property and a higher strength.

Figure 2:
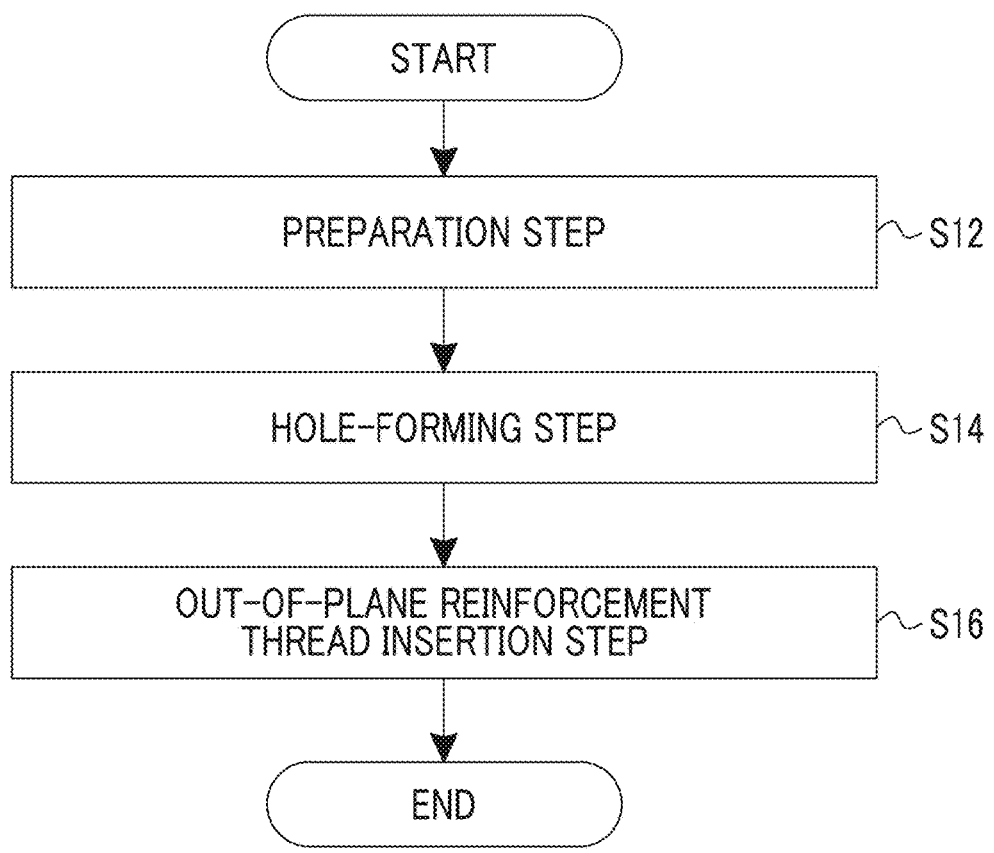
FIG. 2 is a flowchart illustrating an example of treatments in methods for inserting out-of-plane reinforcement threads according to the first embodiment, a second embodiment, a third embodiment, and a fourth embodiment of the present invention which are included in methods for producing a fiber-containing material according to the first embodiment, the second embodiment, the third embodiment, and the fourth embodiment of the present invention.

Treatments in a method for inserting out-of-plane reinforcement threads according to the first embodiment which are included in a method for producing a fiber-containing material according to the first embodiment will be described below. FIG. 2 is a flowchart illustrating an example of treatments in methods for inserting out-of-plane reinforcement threads according to the first embodiment, a second embodiment, a third embodiment, and a fourth embodiment of the present invention which are included in methods for producing a fiber-containing material according to the first embodiment, the second embodiment, the third embodiment, and the fourth embodiment of the present invention. A method for inserting out-of-plane reinforcement threads according to the first embodiment includes a preparation step S12, a hole-forming step S14, and an out-of-plane reinforcement thread insertion step S16 as illustrated in FIG. 2.

The preparation step S12 illustrated in FIG. 2 is a step of preparing the base material 12 including the reinforcement fibers 12f. In detail, the preparation step S12 is a step of preparing the base material 12 in a hole-forming portion 22 illustrated in FIG. 3 that carries out the hole-forming step S14. Meanwhile, in a case in which the hole-forming step S14 is omitted as described below, the preparation step S12 is a step of preparing the base material 12 in a fiber fragment injection portion 24 illustrated in FIG. 4 that carries out the out-of-plane reinforcement thread insertion step S16.

Figure 3:
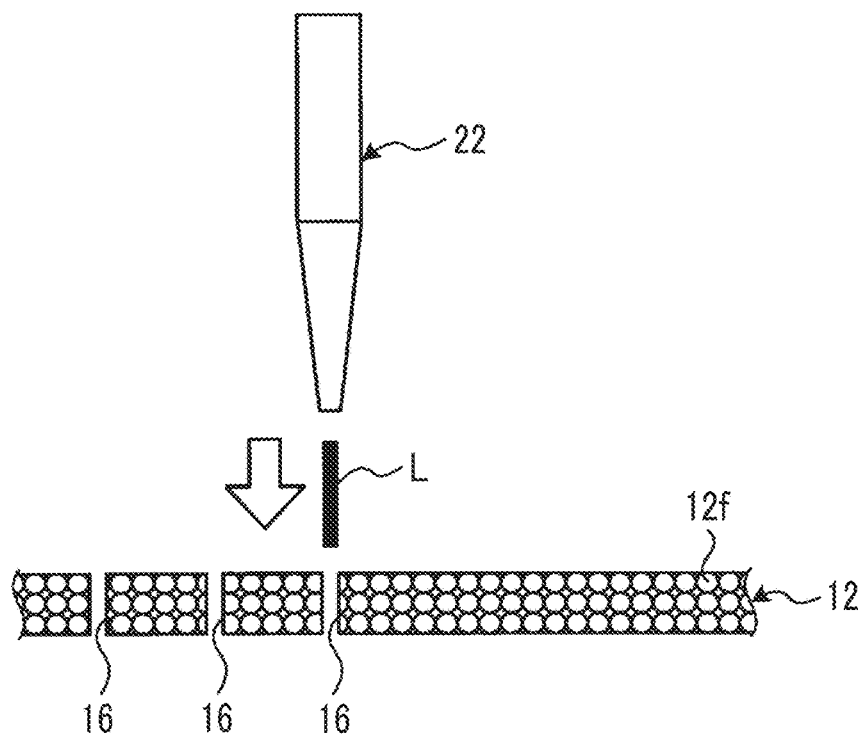
FIG. 3 is a schematic cross-sectional view of a state in which holes are formed in a base material in the first embodiment.

FIG. 3 is a schematic cross-sectional view of a state in which holes are formed in the base material 12 in the first embodiment. In FIG. 3, holes 16 penetrating one surface of the base material 12, that is, along the direction intersecting the direction along the plane from the upside in FIG. 3 are formed in the base material 12 using the hole-forming portion 22. The penetrating holes 16 are holes for inserting the out-of-plane reinforcement threads 14 in the out-of-plane reinforcement thread insertion step S16 described below. The hole-forming portion 22 forms holes in the base material 12 along the direction intersecting the direction along the plane from one surface of the base material 12 as illustrated in FIG. 3, thereby forming the penetrating holes 16. In FIG. 3, as the hole-forming portion 22, a laser radiation portion that radiates a laser L to the base material 12 along the direction intersecting the direction along the plane from one surface of the base material 12 is exemplified.

Figure 4:
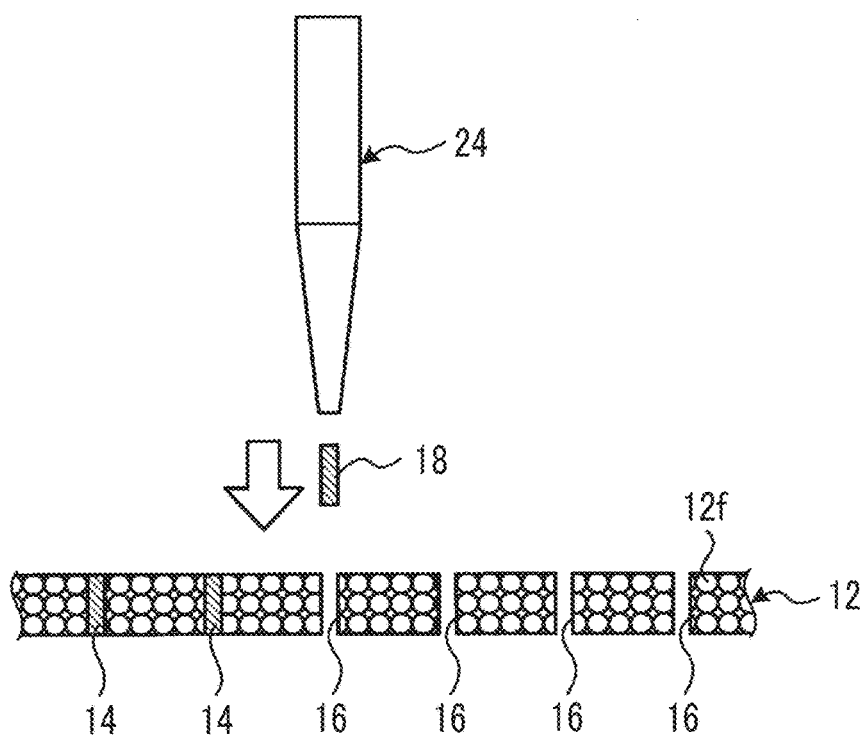
FIG. 4 is a schematic cross-sectional view of a state in which fiber fragments are injected into the base material in the first embodiment.

The hole-forming step S14 in FIG. 2 is a step of forming the holes 16 for inserting the out-of-plane reinforcement threads 14 along the direction intersecting the direction along the plane in the base material 12 after the preparation step S12 and before the out-of-plane reinforcement thread insertion step S16. In detail, the hole-forming step S14 is carried out by radiating the laser L to the base material 12 in the direction intersecting the direction along the plane using the hole-forming portion 22. When the radiation area and the radiation intensity of the laser L is controlled using the hole-forming portion 22, it is possible to control the sizes of the holes 16 in the direction along the plane, thus, insert holes so as to become locations at which fiber fragments 18 that are inserted in the subsequent out-of-plane reinforcement thread insertion step S16 do not penetrate and slide out from the holes, and prevent the fiber fragments from penetrating and sliding out from the holes. Meanwhile, in a case in which the insertion of the fiber fragments 18 into the inside of the base material 12 illustrated in FIG. 4 is possible without forming the holes 16 in the base material 12, the hole-forming step S14 can be omitted. In the case of omitting the hole-forming step S14, the fiber fragments 18 that are inserted in the out-of-plane reinforcement thread insertion step S16 described below substantially carry out the hole-forming step S14.

FIG. 4 is a schematic cross-sectional view of a state in which the fiber fragments 18 are injected into the base material 12 in the first embodiment. In FIG. 4, the fiber fragments 18 are injected and inserted into the holes 16 formed in the hole-forming step S14 on one surface of the base material 12, that is, along the direction intersecting the direction along the plane from the upside in FIG. 4 in the base material 12 using the fiber fragment injection portion 24. As illustrated in FIG. 4, the fiber fragment injection portion 24 injects and inserts the fiber fragments 18 that serve as the out-of-plane reinforcement threads 14 into the holes 16 formed in the base material 12 from one surface of the base material 12 along the direction intersecting the direction along the plane. As the fiber fragment injection portion 24, a device that injects the fiber fragments 18 with the air is exemplified. When the injection rate of the fiber fragments 18 is controlled using the fiber fragment injection portion 24, the fiber fragments are inserted so as to become locations at which the fiber fragments do not penetrate and slide out from the holes 16, and it is possible to prevent the fiber fragments from penetrating and sliding out from the holes.

Figure 5:
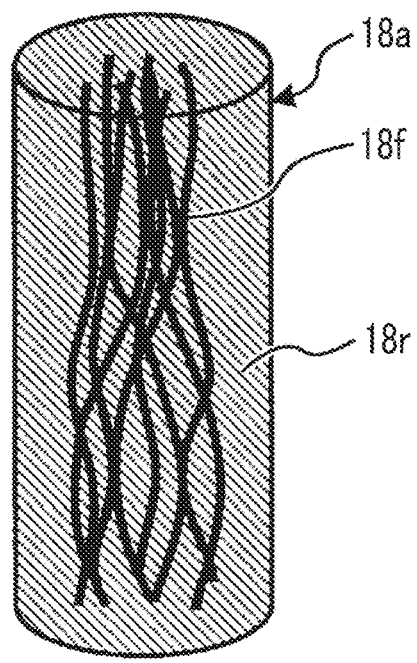
FIG. 5 is a schematic view illustrating an example of the fiber fragment in FIG. 4.
Figure 6:
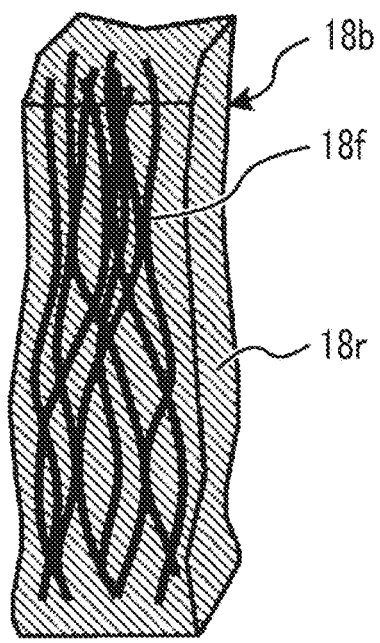
FIG. 6 is a schematic view illustrating another example of the fiber fragment in FIG. 4.

FIG. 5 is a schematic view illustrating a fiber fragment 18a that is an example of the fiber fragment 18 in FIG. 4. FIG. 6 is a schematic view illustrating a fiber fragment 18b that is another example of the fiber fragment 18 in FIG. 4. The fiber fragment 18a includes a basic fiber bundle 18f and a resin 18r that covers the basic fiber bundle 18f as illustrated in FIG. 5. The fiber fragment 18b includes the basic fiber bundle 18f and the resin 18r that covers the basic fiber bundle 18f as illustrated in FIG. 6. As the basic fiber bundle 18f, a bundle of the same basic fibers as the out-of-plane reinforcement thread 14 is exemplified. The basic fiber bundle 18f can be thinned by decreasing the number of basic fibers and can be thickened by increasing the number of the basic fibers. In addition, the basic fiber bundle 18f is capable of thinning the out-of-plane reinforcement threads 14 to be formed by decreasing the number of the basic fibers and is capable of thickening the out-of-plane reinforcement threads 14 to be formed by increasing the number of the basic fibers. As the resin 18r, the same resin as the resin with which the reinforcement fibers 12f are impregnated is exemplified. The fiber fragment 18a and the fiber fragment 18b differ in the overall shape since the amount of the resin 18r differs. As described above, the overall shape of the fiber fragment 18 can be controlled without changing the number of the basic fibers bundled in the basic fiber bundle 18f by controlling the amount of the resin 18r. When the overall shape of the fiber fragment 18 is controlled, it is possible to insert the fiber fragments so as to become locations at which the fiber fragments do not penetrate and slide out from the holes 16 and control the shape of the fiber fragments so as to prevent the fiber fragments from penetrating and sliding out from the holes. Here, the resin 18r may be in any of a cured state or a non-cured state. In addition, the fiber fragment 18 may not include the resin 18r. In this case, the fiber fragment 18 becomes the basic fiber bundle 18f alone.

The out-of-plane reinforcement thread insertion step S16 in FIG. 2 is a step of inserting the out-of-plane reinforcement threads 14 into the inside of the prepared base material 12 in the direction intersecting the direction along the plane. In the out-of-plane reinforcement thread insertion step S16, the out-of-plane reinforcement threads 14 are preferably inserted into the inside of the prepared base material 12 only in the direction intersecting the direction along the plane. In detail, the out-of-plane reinforcement thread insertion step S16 is carried out by injecting the fiber fragments into the base material 12 using the fiber fragment injection portion 24 along the direction intersecting the direction along the plane. The base material 12 becomes the fiber-containing material 10 through the out-of-plane reinforcement thread insertion step S16. In addition, the fiber fragments 18 inserted into the base material 12 become the out-of-plane reinforcement threads 14.

In the method for inserting out-of-plane reinforcement threads according to the first embodiment, the out-of-plane reinforcement threads 14 are inserted without forming in-plane reinforcement threads in the out-of-plane reinforcement thread insertion step S16. Therefore, in the method for inserting out-of-plane reinforcement threads according to the first embodiment, it is possible to cause the reinforcement fibers 12f increasing the strength in the in-plane direction and the out-of-plane reinforcement threads 14 increasing the strength in the out-of-plane direction to coexist in the fiber-containing material 10, and thus it is possible to improve the strength in the out-of-plane direction without a decrease in the strength of the fiber-containing material 10 in the in-plane direction.

In the method for inserting out-of-plane reinforcement threads according to the first embodiment, the out-of-plane reinforcement threads 14 are inserted without being bent in the out-of-plane reinforcement thread insertion step S16. Therefore, in the method for inserting out-of-plane reinforcement threads according to the first embodiment, it is possible to use out-of-plane reinforcement threads and fiber fragments that are softer or harder than the reinforcement fibers 12f as the out-of-plane reinforcement threads 14 and the fiber fragments 18 that serve as the out-of-plane reinforcement threads 14. In addition, in the method for inserting out-of-plane reinforcement threads according to the first embodiment, it is possible to use out-of-plane reinforcement threads and fiber fragments that are thinner or thicker than the reinforcement fibers 12f as the out-of-plane reinforcement threads 14 and the fiber fragments 18 that serve as the out-of-plane reinforcement threads 14. Here, as the fiber fragments 18 softer than the reinforcement fibers 12f, a fiber including a basic fiber softer than the reinforcement fibers 12f as the basic fiber is exemplified. As the fiber fragments 18 harder than the reinforcement fibers 12f, a fiber including a basic fiber harder than the reinforcement fibers 12f as the basic fiber is exemplified. As the fiber fragments 18 thinner than the reinforcement fibers 12f, a fiber including a basic fiber thinner than the reinforcement fibers 12f as the basic fiber is exemplified. As the fiber fragments 18 thicker than the reinforcement fibers 12f, a fiber including a basic fiber thicker than the reinforcement fibers 12f as the basic fiber is exemplified.

In the method for inserting out-of-plane reinforcement threads according to the first embodiment, in a case in which the hole-forming step S14 is not omitted, the out-of-plane reinforcement threads 14 are inserted into the holes 16 formed in the hole-forming step S14 in the out-of-plane reinforcement thread insertion step S16, and thus it is possible to smoothly insert the out-of-plane reinforcement threads 14.

In the method for inserting out-of-plane reinforcement threads according to the first embodiment, the hole-forming step S14 is carried out using the hole-forming portion 22 that radiates the laser L to the base material 12 in the direction intersecting the direction along the plane, and the out-of-plane reinforcement thread insertion step S16 is carried out using the fiber fragment injection portion 24 that injects the fiber fragments 18 that serve as the out-of-plane reinforcement threads 14 into the base material 12 in the direction intersecting the direction along the plane. Therefore, in the method for inserting out-of-plane reinforcement threads according to the first embodiment, it is possible to carry out the hole-forming step S14 without bringing the hole-forming portion 22 into contact with the base material 12 and carry out the out-of-plane reinforcement thread insertion step S16 without bringing the fiber fragment injection portion 24 into contact with the base material 12, and thus it is possible to rapidly and accurately carry out the hole-forming step S14 and the out-of-plane reinforcement thread insertion step S16.

In the method for inserting out-of-plane reinforcement threads according to the first embodiment, in a case in which the out-of-plane reinforcement thread insertion step S16 is carried out using the fiber fragment injection portion 24, it is possible to control the lengths of the out-of-plane reinforcement threads 14 by controlling the lengths of the fiber fragments 18 that are injected using the fiber fragment injection portion 24. Therefore, in the method for inserting out-of-plane reinforcement threads according to the first embodiment, it is possible to insert the out-of-plane reinforcement threads 14 having the same length as the thickness of the base material 12, and thus it is possible to improve the strength in the out-of-plane direction without changing the shape of the fiber-containing material 10. In addition, in the method for inserting out-of-plane reinforcement threads according to the first embodiment, it is possible to smooth the surface of the fiber-containing material 10.

A method for producing a fiber-containing material according to the first embodiment will be described below. The method for producing a fiber-containing material according to the first embodiment includes the treatments of the method for inserting out-of-plane reinforcement threads according to the first embodiment. Therefore, in the method for producing a fiber-containing material according to the first embodiment, in detail, it is possible to produce the fiber-containing material 10 having the out-of-plane reinforcement threads 14 formed in the inside of the base material 12 including the reinforcement fibers 12f using the method for inserting out-of-plane reinforcement threads according to the first embodiment. Therefore, the method for producing a fiber-containing material according to the first embodiment is capable of producing the fiber-containing material 10 which has improved the strength in the out-of-plane direction without a decrease in the strength in the in-plane direction.

The method for producing a fiber-containing material according to the first embodiment preferably includes an impregnation step of impregnating the reinforcement fibers 12f with a resin. In the case of including the impregnation step, the method for producing a fiber-containing material according to the first embodiment is capable of producing the fiber-containing material 10 that is a composite material in which the base material 12 has the reinforcement fibers 12f impregnated with a resin, and thus it is possible to produce the fiber-containing material 10 having a lighter-weight property and a higher strength. The impregnation step may be carried out at any timing of the method for inserting out-of-plane reinforcement threads according to the first embodiment.

In the case of including the impregnation step, the method for producing a fiber-containing material according to the first embodiment preferably includes a curing step of curing the resin. In the case of including the curing step, the method for producing a fiber-containing material according to the first embodiment is capable of producing the fiber-containing material 10 that is a composite material in which the base material 12 is in a semi-cured state or a cured state due to the reinforcement fibers 12f impregnated with the resin, it is possible to produce the fiber-containing material 10 having a structure stabilized in accordance with the lightweight property and the high strength. The curing step is preferably carried out after the out-of-plane reinforcement thread insertion step S16 and after the impregnation step, and, in this case, the out-of-plane reinforcement thread insertion step S16 is carried out before the curing of the resin, and thus it is possible to smoothly carry out the out-of-plane reinforcement thread insertion step S16.

Second Embodiment

Figure 7:
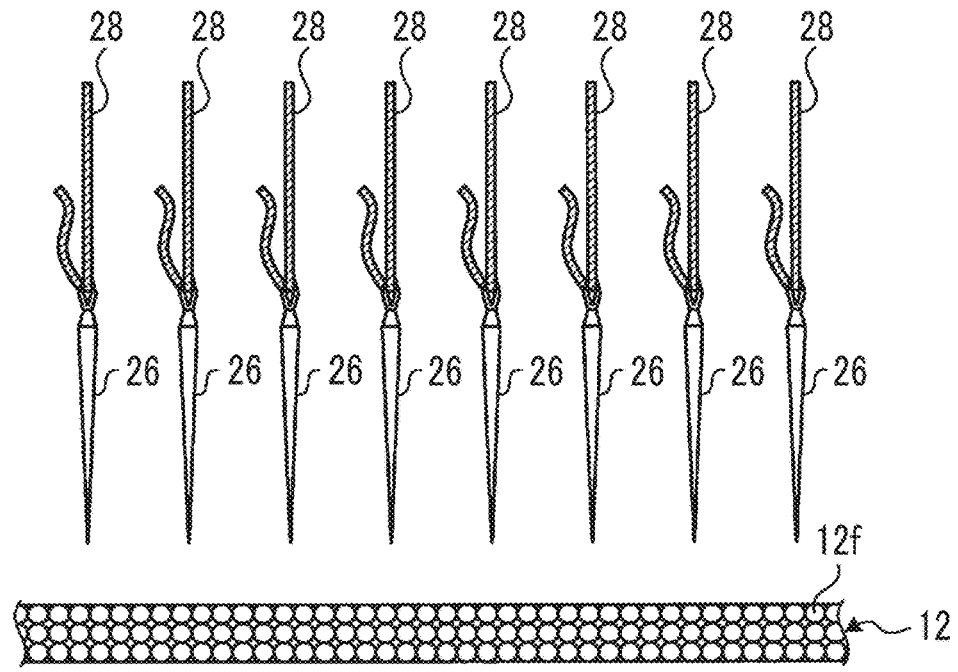
FIG. 7 is a schematic cross-sectional view of a state in which holes are to be formed in the base material in the second embodiment.
Figure 8:
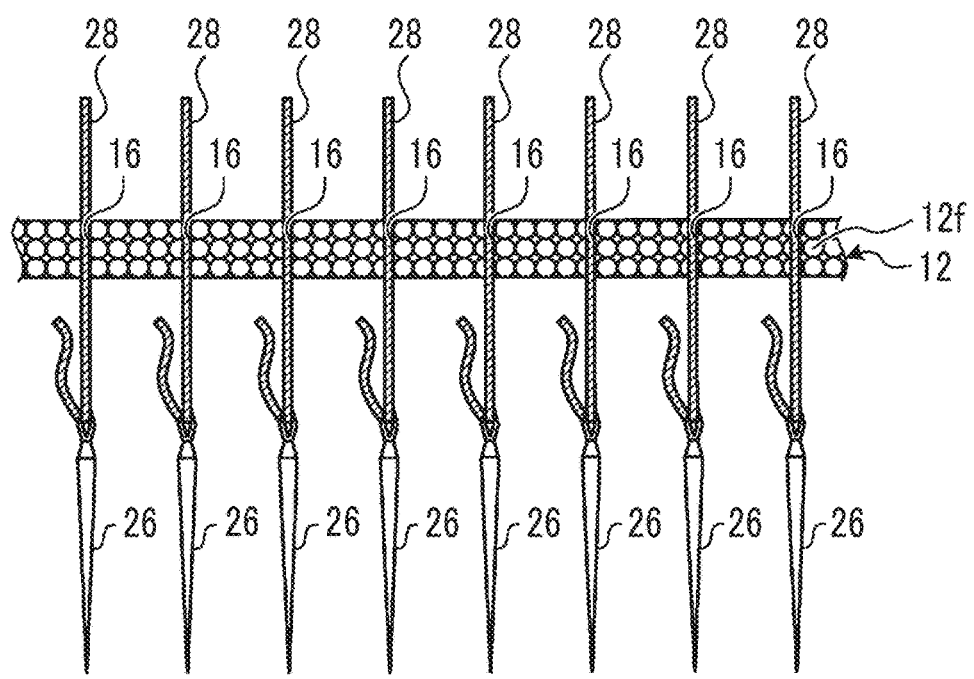
FIG. 8 is a schematic cross-sectional view of a state in which holes are formed in and out-of-plane reinforcement threads are inserted into the base material in the second embodiment.
Figure 9:
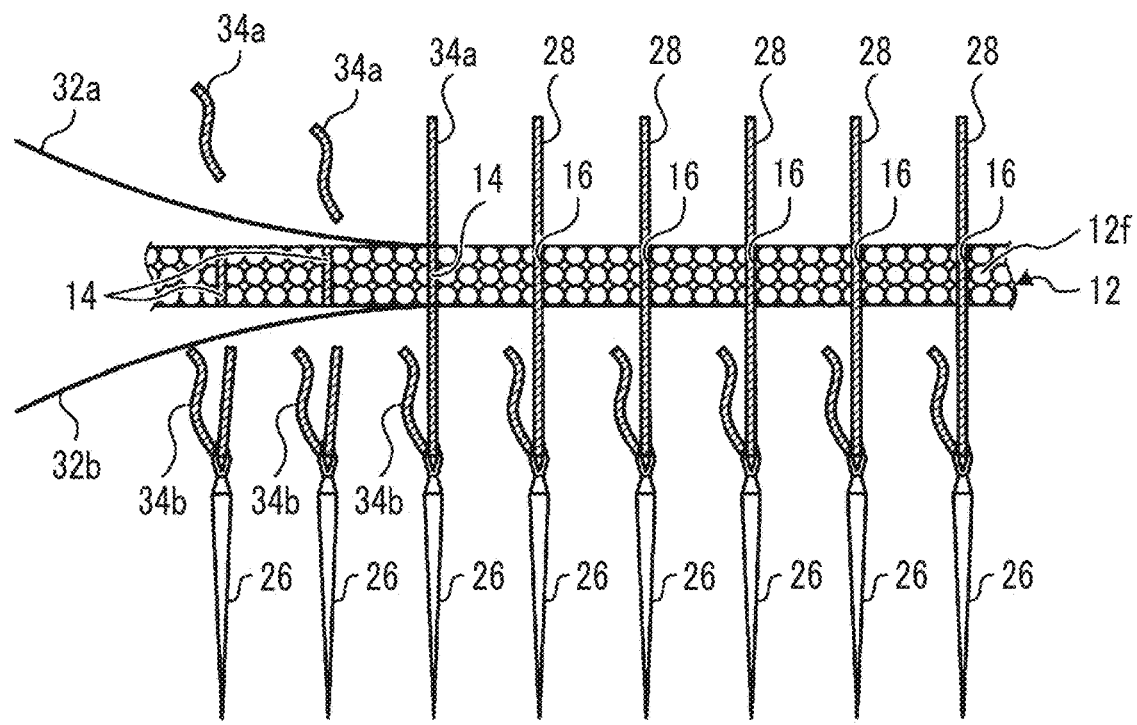
FIG. 9 is a schematic cross-sectional view of a state in which the out-of-plane reinforcement threads inserted into the base material are cut in the second embodiment.

FIG. 7 is a schematic cross-sectional view of a state in which holes are to be formed in the base material 12 in a second embodiment. FIG. 8 is a schematic cross-sectional view of a state in which holes are formed in and insertion fibers 28 that serve as the out-of-plane reinforcement threads 14 are inserted into the base material 12 in the second embodiment. FIG. 9 is a schematic cross-sectional view of a state in which the insertion fibers 28 that serve as the out-of-plane reinforcement threads 14 inserted into the base material are cut in the second embodiment. A method for inserting out-of-plane reinforcement threads according to the second embodiment of the present invention is, similar to the method for inserting out-of-plane reinforcement threads according to the first embodiment, a method for inserting the out-of-plane reinforcement threads 14 into the fiber-containing material 10 according to the first embodiment. The method for inserting out-of-plane reinforcement threads according to the second embodiment of the present invention is a method in which, in the method for inserting out-of-plane reinforcement threads according to the first embodiment, the hole-forming step S14 and the out-of-plane reinforcement thread insertion step S16 are carried out using insertion needles 26, a cutting portion 32a, and a cutting portion 32b instead of carrying out the hole-forming step S14 using the hole-forming portion 22 and the out-of-plane reinforcement thread insertion step S16 using the fiber fragment injection portion 24, and a cutting step is further added after the out-of-plane reinforcement thread insertion step S16. In the description of the second embodiment, the same constitution as in the first embodiment will be given the same reference sign as in the first embodiment and will not be described in detail.

As illustrated in FIG. 7 and FIG. 8, the holes 16 penetrating one surface of the base material 12, that is, along the direction intersecting the direction along the plane from the upside in FIG. 7 and FIG. 8 are formed in the base material 12 using the insertion needles 26. As illustrated in FIG. 7 and FIG. 8, the insertion needles 26 form holes in the base material 12 from one surface of the base material 12 along the direction intersecting the direction along the plane and form the penetrating holes 16. In detail, in FIG. 7 and FIG. 8, the insertion needles 26 are inserted into the base material 12 from one surface of the base material 12 along the direction intersecting the direction along the plane, thereby forming the penetrating holes 16. In detail, the hole-forming step S14 is carried out by inserting the insertion needles 26 into the base material 12. In FIG. 7 and FIG. 8, a state in which a plurality of the insertion needles 26 is arranged in the direction along plane of the base material 12 is exemplified, but the present embodiment include all aspects in which one or more insertion needles 26 are provided.

As illustrated in FIG. 7 and FIG. 8, the insertion fibers 28 are inserted into the base material 12 using the insertion needles 26 having a hole through which the insertion fiber 28 has been passed. The insertion needle 26 has a hole through which the insertion fiber 28 to be inserted into the base material 12 has been passed. As illustrated in FIG. 7 and FIG. 8, the insertion fibers 28 are inserted into the inside of the base material 12 by inserting the insertion needles 26 in a state in which the insertion fibers 28 have been passed through the holes into the base material 12. In detail, the out-of-plane reinforcement thread insertion step S16 is carried out using the insertion needles 26 having the hole through which the insertion fiber 28 to be inserted into the base material 12 has been passed. The insertion fibers 28 inserted into the inside of the base material 12 turn into the out-of-plane reinforcement threads 14 by the out-of-plane reinforcement thread insertion step S16.

As the insertion fiber 28, an insertion fiber including the same basic fiber bundle as the basic fiber bundle 18f included in the fiber fragment 18 is exemplified. As the insertion fiber 28, an insertion fiber obtained by, similar to the basic fiber bundle 18f, bundling the same basic fibers as the out-of-plane reinforcement threads 14 is exemplified. The insertion fiber 28 may further include the same resin as the resin 18r that covers the basic fiber bundle 18f. The basic fiber bundle included in the insertion fiber 28 is, in detail, the same as the basic fiber bundle 18f. The resin that is included in the insertion fiber 28 is, in detail, the same as the resin 18r.

As illustrated in FIG. 9, the inserted insertion fibers 28 are cut on both surface sides using the cutting portion 32a and the cutting portion 32b, thereby forming the out-of-plane reinforcement threads 14 in the inside of the base material 12. In detail, the insertion fibers 28 are cut on one surface of the base material 12 that is the upside surface in FIG. 9 using the cutting portion 32a to remove surplus fibers 34a on one surface side of the insertion fibers 28, the insertion fibers 28 are cut on the other surface that is the downside surface in FIG. 9 using the cutting portion 32b to remove surplus fibers 34b on the other surface side of the insertion fibers 28, part of the insertion fibers 28 are left in the inside of the base material, and part of the insertion fibers 28 left in the inside turn into the out-of-plane reinforcement threads 14, whereby the out-of-plane reinforcement threads 14 are formed in the inside. As illustrated in FIG. 9, the inserted insertion fibers 28 are preferably cut along both surfaces of the base material 12 using the cutting portion 32a and the cutting portion 32b, and, in this case, the out-of-plane reinforcement threads 14 having the same length as the thickness of the base material 12 are formed in the inside.

As illustrated in FIG. 9, the cutting portion 32a and the cutting portion 32b cut the inserted insertion fibers 28 on both surface sides of the base material 12, thereby forming the out-of-plane reinforcement threads 14 in the inside of the base material 12. In detail, the cutting portion 32a cuts the insertion fibers 28 on one surface of the base material 12 that is the upside surface in FIG. 9, the cutting portion 32b cuts the insertion fibers 28 on the other surface of the base material 12 that is the downside surface in FIG. 9, part of the insertion fibers 28 are left in the inside of the base material 12, and part of the insertion fibers 28 inserted into the inside are used as the out-of-plane reinforcement threads 14, whereby the out-of-plane reinforcement threads 14 are formed in the inside of the base material 12. The cutting portion 32a and the cutting portion 32b preferably cut the inserted insertion fibers 28 along both surfaces of the base material 12 as illustrated in FIG. 9, thereby forming the out-of-plane reinforcement threads 14 having the same length as the thickness of the base material 12 in the inside of the base material 12. As both of the cutting portion 32a and the cutting portion 32b, a metal blade is exemplified. However, the cutting portion 32a and the cutting portion 32b are not limited thereto and simply need to be capable of cutting the insertion fibers 28.

The cutting step is a step carried out after the out-of-plane reinforcement thread insertion step S16. The cutting step is a step of cutting the insertion fibers 28 inserted into the base material 12 on both surface sides of the base material 12, thereby turning the cut insertion fibers 28 before into the out-of-plane reinforcement threads 14. In detail, the cutting step is a step of cutting the insertion fibers 28 inserted into the base material 12 on one surface side of the base material 12 using the cutting portion 32a and on the other surfaced side of the base material 12 using the cutting portion 32b, thereby turning the cut insertion fibers 28 into the out-of-plane reinforcement threads 14. The cut insertion fibers 28 are preferably turned into the out-of-plane reinforcement threads 14 having the same length as the thickness of the base material 12 by cutting the insertion fibers 28 inserted into the base material 12 on both surface sides of the base material 12.

In the method for inserting out-of-plane reinforcement threads according to the second embodiment, the hole-forming step S14 is carried out by inserting the insertion needles 26 into the base material 12, and the out-of-plane reinforcement thread insertion step S16 is carried out using the insertion needles 26 having the hole through which the insertion fiber 28 to be inserted into the base material 12 has been passed. Therefore, in the method for inserting out-of-plane reinforcement threads according to the second embodiment, the hole-forming step S14 and the out-of-plane reinforcement thread insertion step S16 can be continuously carried out using the insertion needles 26, and thus it is possible to rapidly and accurately carry out the hole-forming step S14 and the out-of-plane reinforcement thread insertion step S16.

The method for inserting out-of-plane reinforcement threads according to the second embodiment further includes the cutting step of cutting the insertion fibers inserted into the base material 12 on both surface sides of the base material 12 to turn the cut insertion fibers 28 into the out-of-plane reinforcement threads 14. Therefore, in the method for inserting out-of-plane reinforcement threads according to the second embodiment, it is possible to control the length of the out-of-plane reinforcement thread 14 by controlling the cutting location in the cutting step. Therefore, in the method for inserting out-of-plane reinforcement threads according to the second embodiment, the insertion fibers 28 inserted into the base material 12 are cut along both surface of the base material 12 in the cutting step, whereby it is possible to form the out-of-plane reinforcement threads 14 having the same length as the thickness of the base material 12, and thus it is possible to improve the strength in the out-of-plane direction without changing the shape of the fiber-containing material 10. In addition, in the method for inserting out-of-plane reinforcement threads according to the second embodiment, it is possible to smooth the surface of the fiber-containing material 10.

A method for producing a fiber-containing material according to the second embodiment will be described below. The method for producing a fiber-containing material according to the second embodiment includes the treatments of the method for inserting out-of-plane reinforcement threads according to the second embodiment. Therefore, in the method for producing a fiber-containing material according to the second embodiment, in detail, it is possible to produce the fiber-containing material 10 having the out-of-plane reinforcement threads 14 formed in the inside of the base material 12 including the reinforcement fibers 12f using the method for inserting out-of-plane reinforcement threads according to the second embodiment. Therefore, the method for producing a fiber-containing material according to the second embodiment is capable of producing the fiber-containing material 10 which has improved the strength in the out-of-plane direction without a decrease in the strength in the in-plane direction. An impregnation step and a curing step in the method for producing a fiber-containing material according to the second embodiment are the same as the impregnation step and the curing step in the method for producing a fiber-containing material according to the first embodiment.

Third Embodiment

Figure 10:
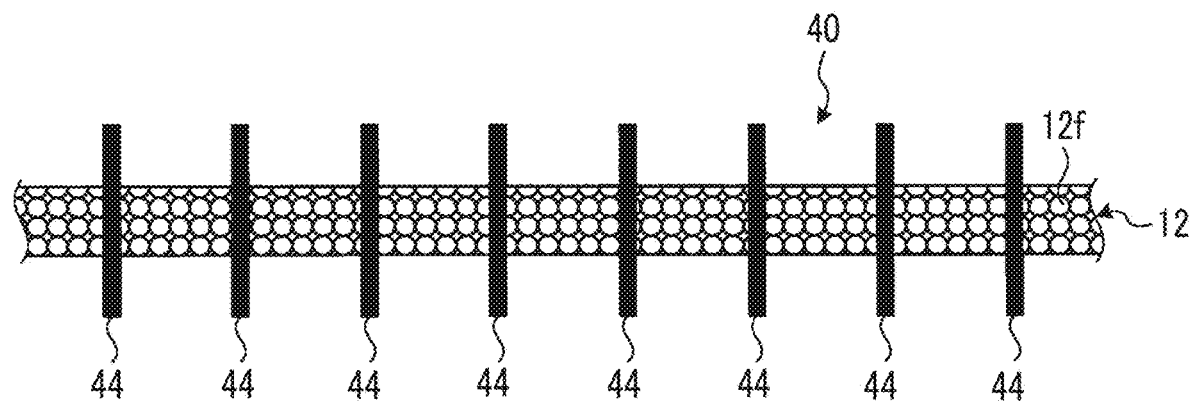
FIG. 10 is a schematic cross-sectional view illustrating an example of a fiber-containing material according to the third embodiment of the present invention.

FIG. 10 is a schematic cross-sectional view illustrating a fiber-containing material 40 that is an example of a fiber-containing material according to the third embodiment of the present invention. As illustrated in FIG. 10, the fiber-containing material 40 according to the third embodiment include the base material 12 and out-of-plane reinforcement threads 44. That is, the fiber-containing material 40 according to the third embodiment is the fiber-containing material 10 according to the first embodiment in which the out-of-plane reinforcement threads 14 are changed to the out-of-plane reinforcement threads 44. In the description of the third embodiment, the same constitution as in the first embodiment will be given the same reference sign as in the first embodiment and will not be described in detail.

The out-of-plane reinforcement thread 44 is different from the out-of-plane reinforcement thread 14 in terms of the fact that the out-of-plane reinforcement thread is longer than the thickness of the base material 12 in the direction intersecting the direction along the plane and protrudes from both surfaces of the base material 12 in the thickness direction. The out-of-plane reinforcement thread 44 is the same as the out-of-plane reinforcement thread 14 except for the length and the protrusion from the base material 12. The out-of-plane reinforcement thread 44 has the above-described constitution, and thus the fiber-containing material 40 is capable of improving the adhesion strength due to the protruding out-of-plane reinforcement threads 44 in the case of adhering a separate member to both surface sides from which the out-of-plane reinforcement threads 44 protrude. In detail, in the fiber-containing material 40, the protruding out-of-plane reinforcement threads 44 serve as out-of-plane reinforcement threads with respect to a separate member to be adhered, and thus it is possible to improve the adhesion strength. In addition, in the fiber-containing material 40, the protruding out-of-plane reinforcement threads 44 generate an anchor effect between a separate member to be adhered and the out out-of-plane reinforcement threads, and thus it is possible to improve the adhesion strength. In addition, in the fiber-containing material 40, the protruding out-of-plane reinforcement threads 44 are capable of holding an adhesive layer with a separate member to be adhered, and thus it is possible to improve the adhesion strength.

Treatments in a method for inserting out-of-plane reinforcement threads according to the third embodiment which are included in a method for producing a fiber-containing material according to the third embodiment will be described below. The method for inserting out-of-plane reinforcement threads according to the third embodiment is a method in which, in the method for inserting out-of-plane reinforcement threads according to the first embodiment, the preparation step S12 is changed as described below, and the hole-forming step S14 and the out-of-plane reinforcement thread insertion step S16 are changed as described below in accordance with the change in the preparation step S12.

Figure 11:
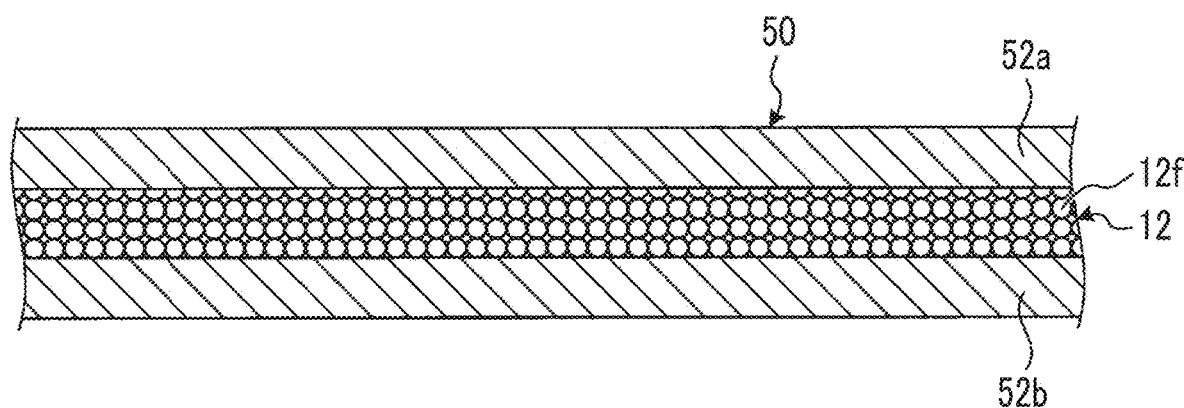
FIG. 11 is a schematic cross-sectional view of a base material on which protective sheets are disposed in the third embodiment.

FIG. 11 is a schematic cross-sectional view of a sheet laminate 50 that is the base material 12 on which a protective sheet 52*a* and a protective sheet 52*b* are disposed in the third embodiment. As illustrated in FIG. 11, the sheet laminate 50 according to the third embodiment includes the base material 12, the protective sheet 52*a*, and the protective sheet 52*b*.

The preparation step S12 in the third embodiment is different from the preparation step S12 in the first embodiment in terms of the fact that the protective sheet 52*a* is disposed on one surface, that is, the upside surface in FIG. 11 of the base material 12 and the protective sheet 52*b* is disposed on the other surface, that is, the downside surface in FIG. 11 of the base material 12. The preparation step S12 in the third embodiment is the same as the preparation step S12 in the first embodiment except for the fact that the protective sheet 52*a* and the protective sheet 52*b* are disposed. The preparation step S12 in the third embodiment is a step of preparing the base material 12 including the reinforcement fibers 12*f* by providing the protective sheet 52*a* and the protective sheet 52*b* on both surfaces of the base material 12 to form the sheet laminate 50.

Figure 12:
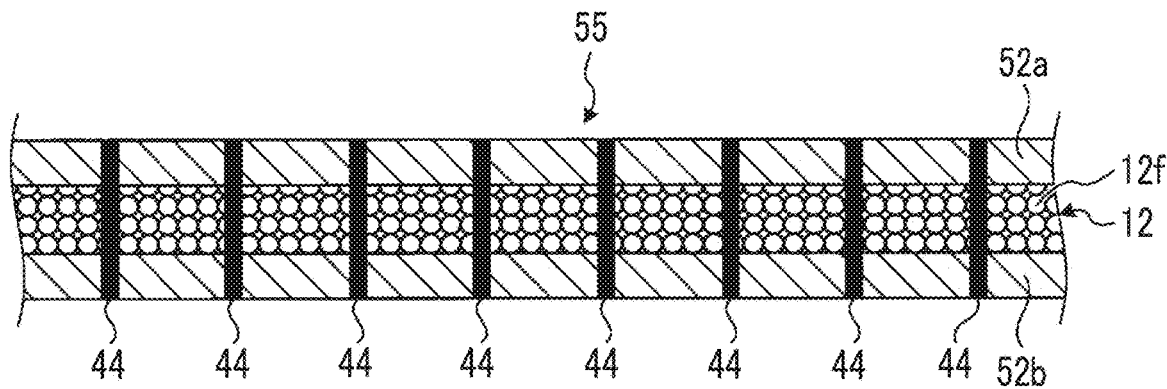
FIG. 12 is a schematic cross-sectional view illustrating an example of a precursor of the fiber-containing material of FIG. 10.

FIG. 12 is a schematic cross-sectional view illustrating a fiber-containing material 55 that is an example of a precursor of the fiber-containing material 40 of FIG. 10. As illustrated in FIG. 12, the fiber-containing material 55 according to the third embodiment includes the base material 12, the protective sheet 52*a*, the protective sheet 52*b*, and the out-of-plane reinforcement threads 44. The out-of-plane reinforcement threads 44 are formed in the inside of the base material 12, the protective sheet 52*a*, and the protective sheet 52*b* so as to penetrate the base material 12, the protective sheet 52*a*, and the protective sheet 52*b* and extend along the out-of-plane direction that is the direction intersecting the direction along the plane.

The protective sheet 52*a* is provided on one surface of the base material 12 on which the out-of-plane reinforcement threads 44 protrude, that is, the upside surface in FIG. 12. The protective sheet 52*b* is provided on the other surface of the base material 12 on which the out-of-plane reinforcement threads 44 protrude, that is, the downside surface in FIG. 12.

As the protective sheet 52*a* and the protective sheet 52*b*, any of a nylon or polyester sheet or a flexible panel or a laminate of a plurality of the above-described sheets or panels is exemplified. The protective sheet 52*a* and the protective sheet 52*b* are not limited thereto and may be other protective sheets. The thicknesses of the protective sheet 52*a* and the protective sheet 52*b* can be controlled by controlling the number of sheets of the above-exemplified material being laminated.

In the fiber-containing material 55, the protective sheet 52*a* and the protective sheet 52*b* are capable of suppressing the damage and contamination of the surface of the base material 12. In addition, in the fiber-containing material 55, the protective sheet 52*a* and the protective sheet 52*b* are capable of suppressing the tension of the out-of-plane reinforcement threads 44.

The protective sheet 52*a* has the same thickness as the length of the out-of-plane reinforcement threads 44 protruding from one surface of the base material 12. In addition, the protective sheet 52*b* has the same thickness as the length of the out-of-plane reinforcement threads 44 protruding from the other surface of the base material 12. That is, the length of the out-of-plane reinforcement thread 44 is the same as the total of the thicknesses of the base material 12, the protective sheet 52*a*, and the protective sheet 52*b*. Therefore, both the protective sheet 52*a* and the protective sheet 52*b* are capable of further suppressing the tension of the out-of-plane reinforcement threads 44. In addition, the length of the out-of-plane reinforcement thread 44 can be controlled by controlling the thicknesses of the protective sheet 52*a* and the protective sheet 52*b*.

The hole-forming step S14 and the out-of-plane reinforcement thread insertion step S16 in the third embodiment are different from the hole-forming step S14 and the out-of-plane reinforcement thread insertion step S16 in the first embodiment in terms of the fact that the subject of the hole-forming step S14 and the out-of-plane reinforcement thread insertion step S16 is the sheet laminate 50 instead of the base material 12. In detail, the hole-forming step S14 in the third embodiment forms the same holes as the holes 16 penetrating the base material 12, the protective sheet 52*a*, and the protective sheet 52*b*. In addition, the out-of-plane reinforcement thread insertion step S16 in the third embodiment inserts the out-of-plane reinforcement threads 44 into the holes formed in the hole-forming step S14 in the third embodiment.

The hole-forming step S14 and the out-of-plane reinforcement thread insertion step S16 in the third embodiment are the same as the hole-forming step S14 and the out-of-plane reinforcement thread insertion step S16 in the first embodiment except for the above-descried difference. The sheet laminate 50 turns into the fiber-containing material 55 by being subject to the hole-forming step S14 and the out-of-plane reinforcement thread insertion step S16. The fiber-containing material 55 is used as the fiber-containing material 40 after being subjected to a sheet removal step of removing the protective sheet 52*a* and the protective sheet 52*b*.

In the method for inserting out-of-plane reinforcement threads according to the third embodiment, the protective sheet 52a and the protective sheet 52b are provided on both surfaces of the base material 12 in the preparation step S12, and the out-of-plane reinforcement threads 44 are inserted into the inside of the base material 12, the protective sheet 52a, and the protective sheet 52b in the direction intersecting the direction along the plane in the out-of-plane reinforcement thread insertion step S16. Therefore, in the method for inserting out-of-plane reinforcement threads according to the third embodiment, it is possible to insert the out-of-plane reinforcement threads 44 that protrude from the base material 12 in the thickness direction longer than the thickness of the base material 12 in the direction intersecting the direction along the plane. Therefore, in the method for inserting out-of-plane reinforcement threads according to the third embodiment, it is possible to improve the adhesion strength due to the protruding out-of-plane reinforcement threads 44 in the case of adhering a separate member to a side of the fiber-containing material 40 from which the out-of-plane reinforcement threads 44 protrude. Furthermore, in the method for inserting out-of-plane reinforcement threads according to the third embodiment, it is possible to control the length of the out-of-plane reinforcement threads 44 that are inserted into the fiber-containing material 40 by controlling the thicknesses of the protective sheet 52a and the protective sheet 52b that are provided in the preparation step S12.

In the method for inserting out-of-plane reinforcement threads according to the third embodiment, the protective sheet 52a and the protective sheet 52b are removed in the sheet removal step. Therefore, in the method for inserting out-of-plane reinforcement threads according to the third embodiment, it is possible to adhere a separate member to the surface of the fiber-containing material 40 which is protected by the protective sheet 52a and the protective sheet 52b until the use of the fiber-containing material 40 and from which the out-of-plane reinforcement threads 44 of the fiber-containing material 40 protrude.

Meanwhile, the method for inserting out-of-plane reinforcement threads according to the third embodiment is not limited to a method in which, in the method for inserting out-of-plane reinforcement threads according to the first embodiment, the preparation step S12 is changed as described above and the hole-forming step S14 and the out-of-plane reinforcement thread insertion step S16 are changed as described above in accordance with the change in the preparation step S12 and may be a method in which, in the method for inserting out-of-plane reinforcement threads according to the second embodiment, the preparation step S12 is changed as described above and the hole-forming step S14 and the out-of-plane reinforcement thread insertion step S16 are changed as described above in accordance with the change in the preparation step S12.

In addition, in the method for inserting out-of-plane reinforcement threads according to the third embodiment, the protective sheet 52a and the protective sheet 52b are disposed in the preparation step S12, and the locations of the out-of-plane reinforcement threads 44 in the direction intersecting the direction along the plane are controlled by controlling the thicknesses of the protective sheet 52a and the protective sheet 52b, but the constitution is not limited thereto. In the method for inserting out-of-plane reinforcement threads according to the third embodiment, in the case of changing the method for inserting out-of-plane reinforcement threads according to the first embodiment, it is possible to control the locations of the out-of-plane reinforcement threads 44 in the direction intersecting the direction along the plane by controlling the radiation area and the radiation intensity of the laser L using the hole-forming portion 22 and controlling the injection rate of the fiber fragments using the fiber fragment injection portion 24. In addition, in the method for inserting out-of-plane reinforcement threads according to the second embodiment, in the case of changing the method for inserting out-of-plane reinforcement threads according to the third embodiment, it is possible to control the locations of the out-of-plane reinforcement threads 44 in the direction intersecting the direction along the plane by controlling the cutting locations in the cutting step. That is, in the method for inserting out-of-plane reinforcement threads according to the third embodiment, the locations of the out-of-plane reinforcement threads 44 in the direction intersecting the direction along the plane may be controlled by carrying out the preparation step S12 using a method other than the disposition of the protective sheet 52a and the protective sheet 52b.

A method for producing a fiber-containing material according to the third embodiment will be described below. The method for producing a fiber-containing material according to the third embodiment includes the treatments of the method for inserting out-of-plane reinforcement threads according to the third embodiment. Therefore, in the method for producing a fiber-containing material according to the third embodiment, in detail, it is possible to produce the fiber-containing material 40 having the out-of-plane reinforcement threads 44 formed in the inside of the base material 12 including the reinforcement fibers 12f using the method for inserting out-of-plane reinforcement threads according to the third embodiment. Therefore, the method for producing a fiber-containing material according to the third embodiment is capable of producing the fiber-containing material 40 which has improved the strength in the out-of-plane direction without a decrease in the strength in the in-plane direction. An impregnation step and a curing step in the method for producing a fiber-containing material according to the third embodiment are the same as the impregnation step and the curing step in the method for producing a fiber-containing material according to the first embodiment.

Fourth Embodiment

Figure 13:
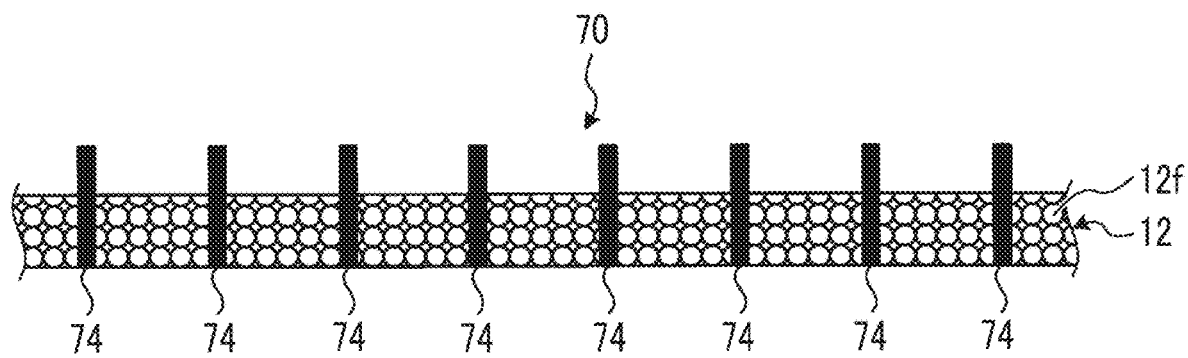
FIG. 13 is a schematic cross-sectional view illustrating an example of a fiber-containing material according to the fourth embodiment of the present invention.

FIG. 13 is a schematic cross-sectional view illustrating a fiber-containing material 70 that is an example of a fiber-containing material according to the fourth embodiment of the present invention. As illustrated in FIG. 13, the fiber-containing material 70 according to the fourth embodiment include the base material 12 and out-of-plane reinforcement threads 74. That is, the fiber-containing material 70 according to the fourth embodiment is the fiber-containing material 10 according to the first embodiment in which the out-of-plane reinforcement threads 14 are changed to the out-of-plane reinforcement threads 74. In the description of the fourth embodiment, the same constitution as in the first embodiment will be given the same reference sign as in the first embodiment and will not be described in detail.

The out-of-plane reinforcement thread 74 is different from the out-of-plane reinforcement thread 14 in terms of the fact that the out-of-plane reinforcement thread is longer than the thickness of the base material 12 in the direction intersecting the direction along the plane and protrudes from one surface side of the base material 12 in the thickness direction. The out-of-plane reinforcement thread 74 is the same as the out-of-plane reinforcement thread 14 except for the length and the protrusion from the base material 12. That is, similar to the out-of-plane reinforcement thread 14, the out-of-plane reinforcement thread 74 does not protrude from the other surface side of the base material 12 in the thickness direction. The out-of-plane reinforcement thread 74 has the above-described constitution, and thus the fiber-containing material 70 is capable of improving the adhesion strength due to the protruding out-of-plane reinforcement threads 74 in the case of adhering a separate member to one surface side from which the out-of-plane reinforcement threads 74 protrude. In detail, in the fiber-containing material 70, for the same reason as that for the protruding out-of-plane reinforcement threads in the fiber-containing material 40 according to the third embodiment, the protruding out-of-plane reinforcement threads 74 are capable of improving the adhesion strength. In addition, in the fiber-containing material 70, the out-of-plane reinforcement thread 74 has the above-described constitution, and thus, on the other surface side from which the out-of-plane reinforcement threads 74 do not protrude, similar to the fiber-containing material 10, the strength in the out-of-plane direction improves without a change in the shape of the other surface side of the fiber-containing material 70 from which the out-of-plane reinforcement threads 74 do not protrude.

In the fiber-containing material 10 of the first embodiment, the out-of-plane reinforcement threads 14 do not protrude from both surfaces of the base material 12, in the fiber-containing material 40 of the third embodiment, the out-of-plane reinforcement threads 44 protrude from both surfaces of the base material 12, and, in the fiber-containing material 70 of the fourth embodiment, the out-of-plane reinforcement threads 74 protrude from one surface of the base material 12, but do not protrude from the other surface. The present invention is not limited thereto, and, in a case in which the out-of-plane reinforcement threads are longer than the thickness of the base material in the direction intersecting the direction along the plane, an aspect in which the out-of-plane reinforcement threads protrude from the base material in at least one side of the thickness direction is also included in the scope of the present invention. In this case, in the case of adhering a separate member to the side from which the out-of-plane reinforcement threads protrude, it is possible to improve the adhesion strength due to the protruding out-of-plane reinforcement threads.

Treatments in a method for inserting out-of-plane reinforcement threads according to the fourth embodiment which are included in a method for producing a fiber-containing material according to the fourth embodiment will be described below. The method for inserting out-of-plane reinforcement threads according to the fourth embodiment is a method in which, in the method for inserting out-of-plane reinforcement threads according to the first embodiment, the preparation step S12 is changed as described below, and the hole-forming step S14 and the out-of-plane reinforcement thread insertion step S16 are changed as described below in accordance with the change in the preparation step S12.

Figure 14:
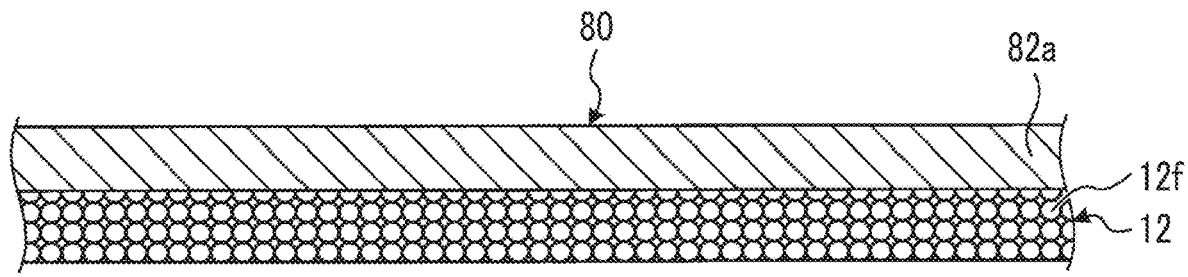
FIG. 14 is a schematic cross-sectional view of a base material on which a protective sheet is disposed in the fourth embodiment.

FIG. 14 is a schematic cross-sectional view of a sheet laminate 80 that is the base material 12 on which a protective sheet 82a is disposed in the fourth embodiment. As illustrated in FIG. 14, the sheet laminate 80 according to the fourth embodiment includes the base material 12 and the protective sheet 82a. That is, the sheet laminate 80 according to the fourth embodiment is a sheet laminate in which, in the sheet laminate 50 according to the third embodiment, the protective sheet 52a is changed to the protective sheet 82a, and the protective sheet 52b is not provided. As the protective sheet 82a, a protective sheet that is the same as the protective sheet 52a according to the third embodiment, including the thickness, is exemplified.

The preparation step S12 in the fourth embodiment is different from the preparation step S12 in the first embodiment in terms of the fact that the protective sheet 82a is disposed on one surface, that is, the upside surface in FIG. 14 of the base material 12. The preparation step S12 in the fourth embodiment is the same as the preparation step S12 in the first embodiment except for the fact that the protective sheet 82a is disposed. The preparation step S12 in the fourth embodiment is a step of preparing the base material 12 including the reinforcement fibers 12f by providing the protective sheet 82a on one surface of the base material 12 to form the sheet laminate 80.

Figure 15:
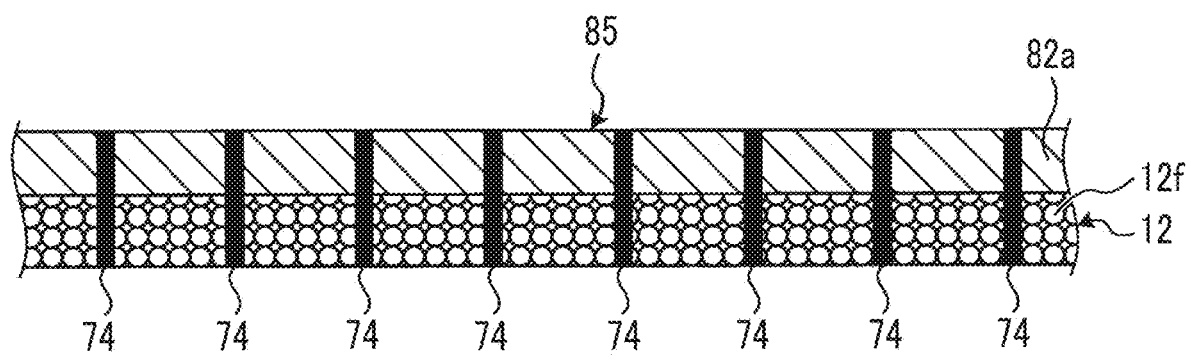
FIG. 15 is a schematic cross-sectional view illustrating an example of a precursor of the fiber-containing material of FIG. 13.
Figure 16:
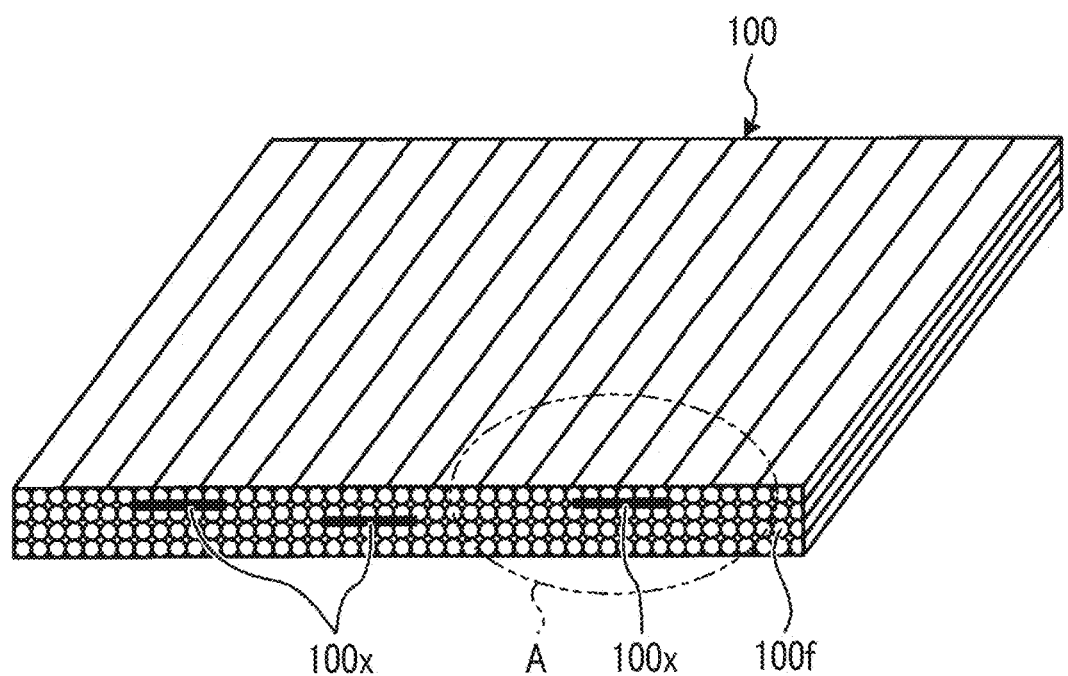
FIG. 16 is a schematic constituent view of a sheet-like composite material of the related art.
Figure 17:
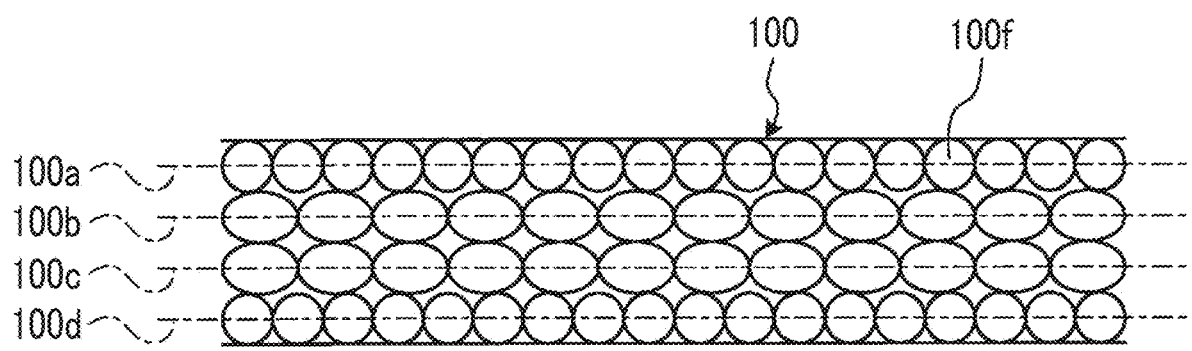
FIG. 17 is a schematic cross-sectional view of the sheet-like composite material of the related art.
Figure 18:
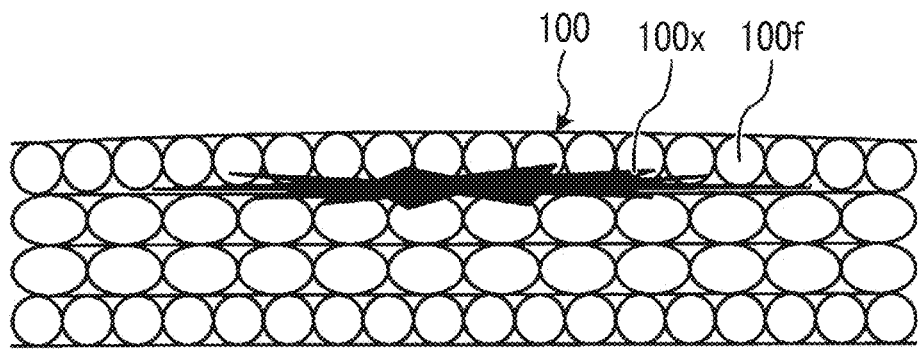
FIG. 18 is an enlarged cross-sectional view of a region A in FIG. 16.
Figure 19:
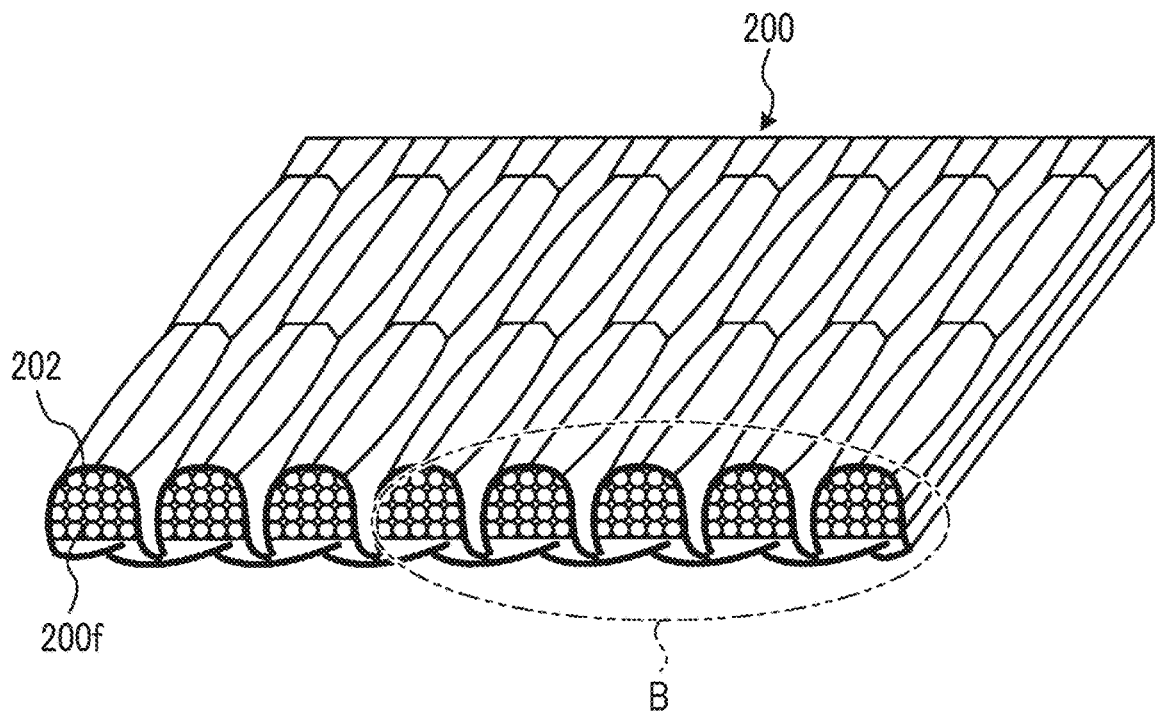
FIG. 19 is a schematic constituent view of an improved sheet-like composite material of the related art.
Figure 20:
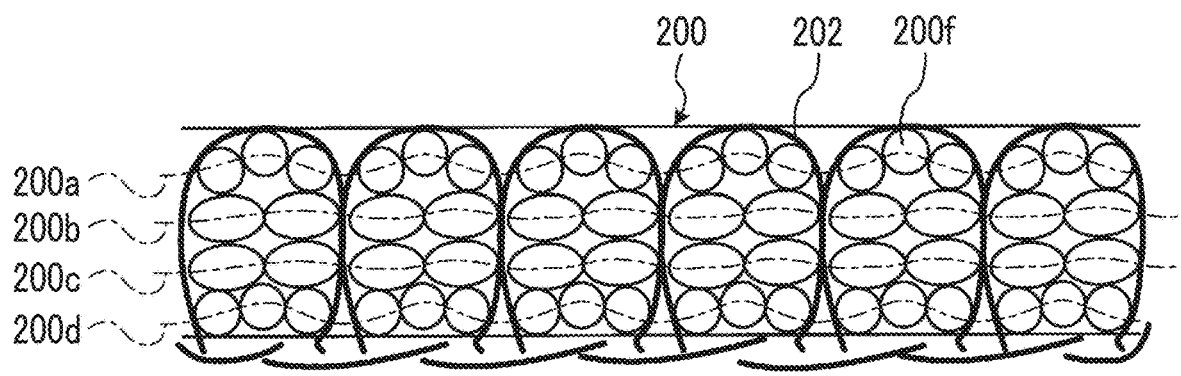
FIG. 20 is an enlarged cross-sectional view of a region B in FIG. 19.

FIG. 15 is a schematic cross-sectional view illustrating a fiber-containing material 85 that is an example of a precursor of the fiber-containing material 70 of FIG. 13. As illustrated in FIG. 15, the fiber-containing material 85 according to the fourth embodiment includes the base material 12, the protective sheet 82a, and the out-of-plane reinforcement threads 74. The out-of-plane reinforcement threads 74 are formed in the inside of the base material 12 and the protective sheet 82a so as to penetrate the base material 12 and the protective sheet 82a and extend along the out-of-plane direction that is the direction intersecting the direction along the plane.

The protective sheet 82a is provided on one surface of the base material 12 on which the out-of-plane reinforcement threads 74 protrude, that is, the upside surface in FIG. 15. On the other surface of the base material 12 on which the out-of-plane reinforcement threads 74 do not protrude, that is, the downside surface in FIG. 15, no protective sheet is provided.

As the protective sheet 82a, the same protective sheet as the protective sheet 52a and the protective sheet 52b is exemplified. Similar to the protective sheet 52a and the protective sheet 52b, the thickness of the protective sheet 82a can be controlled by controlling the number of sheets of the material being laminated.

In the fiber-containing material 85, the protective sheet 82a is, similar to the protective sheet 52a and the protective sheet 52b, capable of suppressing the damage and contamination of the surface of the base material 12. In addition, in the fiber-containing material 85, the protective sheet 82a is, similar to the protective sheet 52a and the protective sheet 52b, capable of suppressing the tension of the out-of-plane reinforcement threads 74.

The protective sheet 82a has the same thickness as the length of the out-of-plane reinforcement threads 74 protruding from one surface of the base material 12. That is, the length of the out-of-plane reinforcement thread 74 is the same as the total of the thicknesses of the base material 12 and the protective sheet 82a. Therefore, the protective sheet 82a is all capable of further suppressing the tension of the out-of-plane reinforcement threads 74. In addition, the length of the out-of-plane reinforcement thread 74 can be controlled by controlling the thickness of the protective sheet 82a.

In the fiber-containing material 55 according to the third embodiment, the protective sheet 52a and the protective sheet 52b are provided on both surfaces that are sides from which the out-of-plane reinforcement threads 44 protrude from the base material 12 respectively. In the fiber-containing material 85 according to the fourth embodiment, the protective sheet 82a is provided on one surface from which the out-of-plane reinforcement threads 74 protrude from the base material 12 and no protective sheet is provided on the other surface from which the out-of-plane reinforcement threads 74 do not protrude from the base material 12. The present invention is not limited thereto, and, in a case in which the out-of-plane reinforcement threads protrude from at least one surface of the base material, an aspect in which a protective sheet is provided on the surface of the base material from which the out-of-plane reinforcement threads protrude is also included in the scope of the present invention. In this case, the protective sheet is capable of suppressing the tension of the out-of-plane reinforcement threads included in the fiber-containing material and capable of decreasing the damage and contamination of the surface of the base material.

The hole-forming step S14 and the out-of-plane reinforcement thread insertion step S16 in the fourth embodiment are different from the hole-forming step S14 and the out-of-plane reinforcement thread insertion step S16 in the first embodiment in terms of the fact that the subject of the hole-forming step S14 and the out-of-plane reinforcement thread insertion step S16 is the sheet laminate 80 instead of the base material 12. In detail, the hole-forming step S14 in the fourth embodiment forms the same holes as the holes 16 penetrating the base material 12 and the protective sheet 82a. In addition, the out-of-plane reinforcement thread insertion step S16 in the fourth embodiment inserts the out-of-plane reinforcement threads 74 into the holes formed in the hole-forming step S14 in the fourth embodiment.

The hole-forming step S14 and the out-of-plane reinforcement thread insertion step S16 in the fourth embodiment are the same as the hole-forming step S14 and the out-of-plane reinforcement thread insertion step S16 in the first embodiment except for the above-described difference. The sheet laminate 80 turns into the fiber-containing material 85 by being subject to the hole-forming step S14 and the out-of-plane reinforcement thread insertion step S16. The fiber-containing material 85 is used as the fiber-containing material 70 after being subjected to a sheet removal step of removing the protective sheet 82a.

In the method for inserting out-of-plane reinforcement threads according to the fourth embodiment, the protective sheet 82a is provided on one surface of the base material 12 in the preparation step S12, and the out-of-plane reinforcement threads 74 are inserted into the inside of the base material 12 and the protective sheet 82a in the direction intersecting the direction along the plane in the out-of-plane reinforcement thread insertion step S16. Therefore, in the method for inserting out-of-plane reinforcement threads according to the fourth embodiment, it is possible to insert the out-of-plane reinforcement threads 74 that protrude from the base material 12 in the thickness direction longer than the thickness of the base material 12 in the direction intersecting the direction along the plane. Therefore, in the method for inserting out-of-plane reinforcement threads according to the fourth embodiment, it is possible to improve the adhesion strength due to the protruding out-of-plane reinforcement threads 74 in the case of adhering a separate member to a side of the fiber-containing material 70 from which the out-of-plane reinforcement threads 74 protrude. Furthermore, in the method for inserting out-of-plane reinforcement threads according to the fourth embodiment, it is possible to control the length of the out-of-plane reinforcement threads 74 that are inserted into the fiber-containing material 70 by controlling the thickness of the protective sheet 82a that is provided in the preparation step S12.

In the method for inserting out-of-plane reinforcement threads according to the fourth embodiment, the protective sheet 82a is removed in the sheet removal step. Therefore, in the method for inserting out-of-plane reinforcement threads according to the fourth embodiment, it is possible to adhere a separate member to the surface of the fiber-containing material 70 which is protected by the protective sheet 82a until the use of the fiber-containing material 70 and from which the out-of-plane reinforcement threads 74 of the fiber-containing material 70 protrude.

Meanwhile, the method for inserting out-of-plane reinforcement threads according to the fourth embodiment is not limited to a method in which, in the method for inserting out-of-plane reinforcement threads according to the first embodiment, the preparation step S12 is changed as described above and the hole-forming step S14 and the out-of-plane reinforcement thread insertion step S16 are changed as described above in accordance with the change in the preparation step S12 and may be a method in which, in the method for inserting out-of-plane reinforcement threads according to the second embodiment, the preparation step S12 is changed as described above and the hole-forming step S14 and the out-of-plane reinforcement thread insertion step S16 are changed as described above in accordance with the change in the preparation step S12.

In addition, in the method for inserting out-of-plane reinforcement threads according to the fourth embodiment, the protective sheet 82a is disposed in the preparation step S12, and the locations of the out-of-plane reinforcement threads 74 in the direction intersecting the direction along the plane are controlled by controlling the thickness of the protective sheet 82a, but the constitution is not limited thereto. In the method for inserting out-of-plane reinforcement threads according to the fourth embodiment, in the case of changing the method for inserting out-of-plane reinforcement threads according to the first embodiment, it is possible to control the locations of the out-of-plane reinforcement threads 74 in the direction intersecting the direction along the plane by controlling the radiation area and the radiation intensity of the laser L using the hole-forming portion 22 and controlling the injection rate of the fiber fragments 18 using the fiber fragment injection portion 24. In addition, in the method for inserting out-of-plane reinforcement threads according to the second embodiment, in the case of changing the method for inserting out-of-plane reinforcement threads according to the fourth embodiment, it is possible to control the locations of the out-of-plane reinforcement threads 74 in the direction intersecting the direction along the plane by controlling the cutting locations in the cutting step. That is, in the method for inserting out-of-plane reinforcement threads according to the fourth embodiment, the locations of the out-of-plane reinforcement threads 74 in the direction intersecting the direction along the plane may be controlled by carrying out the preparation step S12 using a method other than the disposition of the protective sheet 82a.

In the method for inserting out-of-plane reinforcement threads according to the third embodiment, the protective sheet 52a and the protective sheet 52b are respectively provided on both surface sides of the base material 12 in the preparation step S12, and the out-of-plane reinforcement threads 44 are inserted into the inside of the base material 12, the protective sheet 52a, and the protective sheet 52b in the direction intersecting the direction along the plane of the base material 12 in the out-of-plane reinforcement thread insertion step S16. In the method for inserting out-of-plane reinforcement threads according to the fourth embodiment, the protective sheet 82a is provided on one surface side of the base material 12 in the preparation step S12, and the out-of-plane reinforcement threads 74 are inserted into the inside of the base material 12 and the protective sheet 82a in the direction intersecting the direction along the plane of the base material 12 in the out-of-plane reinforcement thread insertion step S16. The present invention is not limited thereto, and a case in which a protective sheet is provided on at least one of the base material in a preparation step and out-of-plane reinforcement threads are inserted into the inside of a base material and the protective sheet provided on at least one of the base material in the direction intersecting the direction along the plane of the base material in an out-of-plane reinforcement thread insertion step is also included in the scope of the present invention. In this case, it is possible to insert out-of-plane reinforcement threads that are longer then the thickness of the base material in the direction intersecting the direction along the plane and protrude from the base material in at least one side of the thickness direction, and thus, in the case of adhering a separate member to the side from which the out-of-plane reinforcement threads protrude, it is possible to improve the adhesion strength due to the protruding out-of-plane reinforcement threads.

A method for producing a fiber-containing material according to the fourth embodiment will be described below. The method for producing a fiber-containing material according to the fourth embodiment includes the treatments of the method for inserting out-of-plane reinforcement threads according to the fourth embodiment. Therefore, in the method for producing a fiber-containing material according to the fourth embodiment, in detail, it is possible to produce the fiber-containing material 70 having the out-of-plane reinforcement threads 74 formed in the inside of the base material 12 including the reinforcement fibers 12$f$ using the method for inserting out-of-plane reinforcement threads according to the fourth embodiment. Therefore, the method for producing a fiber-containing material according to the fourth embodiment is capable of producing the fiber-containing material 70 which has improved the strength in the out-of-plane direction without a decrease in the strength in the in-plane direction. An impregnation step and a curing step in the method for producing a fiber-containing material according to the fourth embodiment are the same as the impregnation step and the curing step in the method for producing a fiber-containing material according to the first embodiment.

REFERENCE SIGNS LIST 10, 40, 55, 70, 85 FIBER-CONTAINING MATERIAL
12 BASE MATERIAL
12$f$, 100$f$, 200$f$ REINFORCEMENT FIBER
14, 44, 74 OUT-OF-PLANE THREAD
16 HOLE
18, 18$a$, 18$b$ FIBER FRAGMENT
18$f$ BASIC FIBER BUNDLE
18$r$ RESIN
22 HOLE-FORMING PORTION
24 FIBER FRAGMENT INJECTION PORTION
26 INSERTION NEEDLE
28 INSERTION FIBER
32$a$, 32$b$ CUTTING PORTION
34$a$, 34$b$ SURPLUS FIBER
50, 80 SHEET LAMINATE
52$a$, 52$b$, 82$a$ PROTECTIVE SHEET
100, 200 COMPOSITE MATERIAL
100$a$, 100$b$, 100$c$, 100$d$, 200$a$, 200$b$, 200$c$, 200$d$ CENTRAL AXIS OF FIBER LAYER
100$x$ INTERLAYER BREAKAGE PORTION

The invention claimed is:

1. A method for inserting out-of-plane reinforcement threads comprising:
    a preparation step of preparing a base material including reinforcement fibers that extend in a direction along a plane and providing a protective sheet on at least one surface of the base material to form a sheet laminate;
    a hole-forming step of forming a hole for inserting out-of-plane reinforcement threads in a direction inserting the direction along the plane, in which the reinforcement fibers extend, in the base material and the protective sheet, after the preparation step and before an out-of-plane reinforcement thread insertion step;
    the out-of-plane reinforcement thread insertion step of inserting the out-of-plane reinforcement threads into an inside of the prepared base material and an inside of the prepared protective sheet only in the direction intersecting the direction along the plane, wherein a length of the out-of-plane reinforcement threads is the same as a total of thickness of the base material and the protective sheet forming the sheet laminate; and
    a sheet removal step of removing the protective sheet after the out-of-plane reinforcement thread insertion step such that the out-of-plane reinforcement threads protrude from the base material by a length corresponding to the thickness of the protective sheet.

2. The method for inserting out-of-plane reinforcement threads according to claim 1,
    wherein the hole-forming step is carried out using a hole-forming portion that radiates a laser to the protective sheet and the base material in the direction intersecting the direction along the plane, and
    the out-of-plane reinforcement thread insertion step is carried out using a fiber fragment injection portion that injects fiber fragments which serve as the out-of-plane reinforcement threads into the protective sheet and the base material in the direction intersecting the direction along the plane.

3. A method for producing a fiber-containing material, comprising:
    producing a fiber-containing material in which the out-of-plane reinforcement threads are formed in the inside of the base material including the reinforcement fibers using the method for inserting out-of-plane reinforcement threads according to claim 1.

4. The method for producing a fiber-containing material according to claim 3, further comprising:
    an impregnation step of impregnating the reinforcement fibers with a resin.

5. The method for producing a fiber-containing material according to claim 4, further comprising:
    a curing step of curing the resin after the out-of-plane reinforcement thread insertion step and after the impregnation step.

* * * * *